United States Patent
Chiang et al.

(10) Patent No.: US 9,869,842 B2
(45) Date of Patent: Jan. 16, 2018

(54) IMAGING LENS AND ELECTRONIC APPARATUS INCLUDING THE SAME

(71) Applicant: Genius Electronic Optical Co., Ltd., Taichung (TW)

(72) Inventors: Yita Chiang, Taichung (TW); Wenbin Lin, Fujian (CN); Jinhui Gong, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 58 days.

(21) Appl. No.: 14/739,998

(22) Filed: Jun. 15, 2015

(65) Prior Publication Data

US 2016/0274330 A1 Sep. 22, 2016

(30) Foreign Application Priority Data

Mar. 17, 2015 (CN) .......................... 2015 1 0115363

(51) Int. Cl.
| | |
|---|---|
| *G02B 13/18* | (2006.01) |
| *G02B 9/36* | (2006.01) |
| *G02B 13/00* | (2006.01) |
| *G02B 9/34* | (2006.01) |
| *G02B 7/02* | (2006.01) |

(52) U.S. Cl.
CPC ............. *G02B 13/004* (2013.01); *G02B 9/34* (2013.01); *G02B 9/36* (2013.01); *G02B 7/021* (2013.01)

(58) Field of Classification Search
CPC . G02B 9/00; G02B 9/34; G02B 13/00; G02B 13/001; G02B 13/0015; G02B 13/002; G02B 13/004; G02B 9/36; G02B 9/38
See application file for complete search history.

(56) References Cited

U.S. PATENT DOCUMENTS

| | | | | |
|---|---|---|---|---|
| 8,189,272 | B1 * | 5/2012 | Huang | G02B 13/004 |
| | | | | 359/715 |
| 2011/0115962 | A1 * | 5/2011 | Chen | G02B 9/34 |
| | | | | 348/335 |
| 2012/0062782 | A1 * | 3/2012 | Huang | G02B 15/161 |
| | | | | 348/340 |
| 2012/0281299 | A1 * | 11/2012 | Hsu | G02B 13/004 |
| | | | | 359/715 |
| 2013/0155526 | A1 | 6/2013 | Hsieh et al. | |
| 2013/0208365 | A1 | 8/2013 | Hsu et al. | |
| 2013/0321920 | A1 * | 12/2013 | Suzuki | G02B 27/42 |
| | | | | 359/566 |
| 2014/0185151 | A1 * | 7/2014 | Chen | G02B 13/004 |
| | | | | 359/773 |
| 2014/0211328 | A1 * | 7/2014 | Hashimoto | G02B 13/0045 |
| | | | | 359/714 |

FOREIGN PATENT DOCUMENTS

| | | |
|---|---|---|
| TW | 201323920 | 6/2013 |
| TW | 201447360 | 12/2014 |

OTHER PUBLICATIONS

"Office Action of Taiwan Counterpart Application," date Dec. 2, 2015, p. 1-p. 4.

* cited by examiner

*Primary Examiner* — Thong Nguyen
(74) *Attorney, Agent, or Firm* — JCIPRNET

(57) ABSTRACT

An imaging lens includes first to fourth lens elements arranged from an object side to an image side in the given order. Through designs of surfaces of the lens elements and relevant lens parameters, a short system length of the imaging lens may be achieved while maintaining good optical performance.

18 Claims, 36 Drawing Sheets

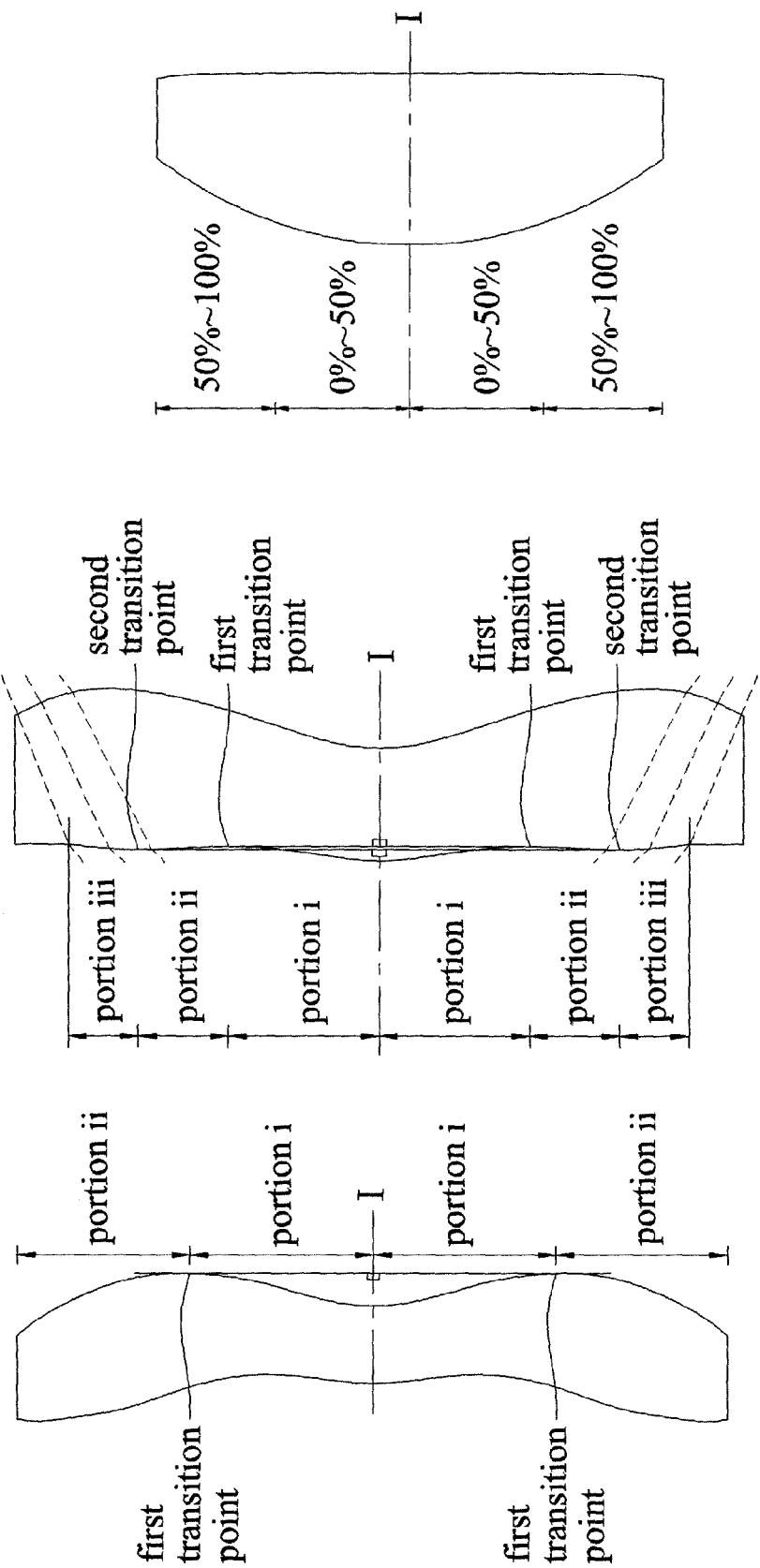

first embodiment system focal length =2.102mm, half field-of-view =39.278°, F-number =2.266, system length =3.199mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| | | ∞ | 0.02 | | | |
| first lens element 3 | object-side surface 31 | 2.323922685 | 0.578649592 | 1.544101969 | 56.11429148 | 2.327908992 |
| | image-side surface 32 | -2.558135959 | 0.059154168 | | | |
| second lens element 4 | object-side surface 41 | 3.357079713 | 0.211445386 | 1.642830028 | 22.43731776 | -24.86452406 |
| | image-side surface 42 | 2.709362659 | 0.356605629 | | | |
| third lens element 5 | object-side surface 51 | -0.456931493 | 0.249241824 | 1.544101969 | 56.11429148 | -167.2405948 |
| | image-side surface 52 | -0.547690901 | 0.058281471 | | | |
| fourth lens element 6 | object-side surface 61 | 1.095710877 | 0.699226725 | 1.531160165 | 56.04382797 | 12.21572863 |
| | image-side surface 62 | 1.025198926 | 0.22 | | | |
| optical filter 9 | object-side surface 91 | ∞ | 0.3 | 1.516800035 | 64.16733624 | |
| | image-side surface 92 | ∞ | 0.466537069 | | | |
| image plane 100 | | ∞ | | | | |

FIG. 7

| | | | | first embodiment | | | | | |
|---|---|---|---|---|---|---|---|---|---|
| surface | K | a2 | a4 | a6 | a8 | a10 | a12 | a14 | a16 |
| 31 | 1.545103E+01 | 0.000000E+00 | -3.303080E-01 | -1.297452E+00 | 6.227610E+00 | -3.014514E+01 | -2.231613E+01 | 3.723196E+02 | -7.585597E+02 |
| 32 | -3.181936E+00 | 0.000000E+00 | -1.825854E+00 | 5.941617E+00 | -1.761331E+01 | 3.299188E+01 | -3.455975E+01 | 6.870271E+00 | 1.168860E+01 |
| 41 | -2.577123E+02 | 0.000000E+00 | -1.053876E+00 | -1.139162E-01 | 4.050401E+00 | -8.859679E+00 | 5.467129E+00 | 2.058395E+01 | -2.756276E+01 |
| 42 | -1.104448E+01 | 0.000000E+00 | -5.068288E-02 | -7.615048E-01 | 2.145031E-01 | 5.897789E-01 | 2.244426E+00 | -4.968511E+00 | 2.435815E+00 |
| 51 | -1.473980E+00 | 0.000000E+00 | 1.847137E+00 | -4.648612E+00 | 9.433185E+00 | -9.947602E+00 | 8.305026E+00 | -9.720855E+00 | 5.784742E+00 |
| 52 | -4.209436E+00 | 0.000000E+00 | -1.421510E+00 | 6.723107E+00 | -1.700716E+01 | 1.763290E+01 | 2.366056E+01 | -6.248036E+01 | 3.440865E+01 |
| 61 | -8.605605E-02 | 0.000000E+00 | -7.812695E-01 | 6.527908E-01 | -5.644544E-01 | 1.357514E-01 | 5.497716E-01 | 4.842518E-02 | -7.218512E-02 |
| 62 | -6.396094E+00 | 0.000000E+00 | -1.810224E-01 | 1.831166E-01 | -2.062508E-01 | 1.389239E-01 | -5.476966E-02 | 1.205870E-02 | -1.296205E-03 |

FIG.8

FIG. 11 second embodiment system focal length =2.103mm, half field-of-view =38.708°, F-number =2.234, system length =3.2549mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| | | ∞ | 0.02 | | | |
| first lens element 3 | object-side surface 31 | 2.296265352 | 0.645225532 | 1.544101969 | 56.11429148 | 2.179640607 |
| | image-side surface 32 | -2.224795359 | 0.090513277 | | | |
| second lens element 4 | object-side surface 41 | 3.011557069 | 0.199979991 | 1.642830028 | 22.43731776 | -15.7618709 |
| | image-side surface 42 | 2.26500114 | 0.2822212753 | | | |
| third lens element 5 | object-side surface 51 | -0.504858292 | 0.341298758 | 1.544101969 | 56.11429148 | 13.89623329 |
| | image-side surface 52 | -0.586365506 | 0.059986357 | | | |
| fourth lens element 6 | object-side surface 61 | 1.131899527 | 0.548908342 | 1.531160165 | 56.04382797 | 32.71836609 |
| | image-side surface 62 | 1.006416542 | 0.22 | | | |
| optical filter 9 | object-side surface 91 | ∞ | 0.3 | 1.516800035 | 64.16733624 | |
| | image-side surface 92 | ∞ | 0.566064349 | | | |
| image plane 100 | | ∞ | | | | |

| | | | | | second embodiment | | | | |
|---|---|---|---|---|---|---|---|---|---|
| surface | K | a2 | a4 | a6 | a8 | a10 | a12 | a14 | a16 |
| 31 | 1.545103E+01 | 0.000000E+00 | -3.201985E-01 | -1.093396E+00 | 2.334697E+00 | -2.546845E+00 | -1.121460E+02 | 5.077485E+02 | -8.645679E+02 |
| 32 | -3.181936E+00 | 0.000000E+00 | -1.926027E+00 | 6.841600E+00 | -2.075666E+01 | 3.877144E+01 | -3.520677E+01 | -9.494976E+00 | 2.993309E+01 |
| 41 | -2.577123E+02 | 0.000000E+00 | -1.700236E+00 | 1.257673E+00 | 6.514249E+00 | -2.020289E+01 | -5.209234E+00 | 8.881465E+01 | -8.643062E+01 |
| 42 | -1.104448E+01 | 0.000000E+00 | -8.338850E-01 | 1.804443E+00 | -2.248238E+00 | -3.222738E+00 | 1.053803E+01 | -6.312125E+00 | -5.685174E-01 |
| 51 | -1.473980E+00 | 0.000000E+00 | 1.018960E+00 | -2.291841E+00 | 7.526120E+00 | -1.217809E+01 | 9.807530E+00 | -3.910593E+00 | 7.211184E-01 |
| 52 | -4.209436E+00 | 0.000000E+00 | -1.483517E+00 | 5.707183E+00 | -1.235419E+01 | 1.084327E+01 | 1.845394E+01 | -4.245742E+01 | 2.225504E+01 |
| 61 | -8.605605E-02 | 0.000000E+00 | -6.336449E-01 | 4.839842E-01 | -4.662568E-01 | 2.660264E-01 | -2.146189E-01 | 2.111161E-01 | -9.564641E-02 |
| 62 | -6.396094E+00 | 0.000000E+00 | -1.865262E-01 | 2.032510E-01 | -2.291004E-01 | 1.513066E-01 | -5.640709E-02 | 1.138419E-02 | -1.252088E-03 |

FIG.12 third embodiment system focal length =2.108mm, half field-of-view =39.042°, F-number =2.234, system length =3.589mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| | | | 0.02 | | | |
| first lens element 3 | object-side surface 31 | 2.857349044 | 0.585483363 | 1.544101969 | 56.11429148 | 2.504856652 |
| | image-side surface 32 | -2.432932694 | 0.162688649 | | | |
| second lens element 4 | object-side surface 41 | 3.606390673 | 0.300766577 | 1.642830028 | 22.43731776 | -7.316976036 |
| | image-side surface 42 | 1.981095823 | 0.233738926 | | | |
| third lens element 5 | object-side surface 51 | -0.832876691 | 0.649808893 | 1.544101969 | 56.11429148 | 2.074890762 |
| | image-side surface 52 | -0.612216468 | 0.059378073 | | | |
| fourth lens element 6 | object-side surface 61 | 1.32881893 | 0.450275421 | 1.531160165 | 56.04382797 | -4.597154958 |
| | image-side surface 62 | 0.760026837 | 0.22 | | | |
| optical filter 9 | object-side surface 91 | ∞ | 0.3 | 1.516800035 | 64.16733624 | |
| | image-side surface 92 | ∞ | 0.627250792 | | | |
| image plane 100 | | ∞ | | | | |

FIG. 15

| surface | K | a2 | a4 | a6 | a8 | a10 | a12 | a14 | a16 |
|---|---|---|---|---|---|---|---|---|---|
| 31 | 1.545103E+01 | 0.000000E+00 | -3.445269E-01 | 1.273428E+00 | -1.726410E+01 | 7.969678E+01 | -1.668387E+02 | -9.120503E+00 | 2.951874E+02 |
| 32 | -3.181936E+00 | 0.000000E+00 | -1.245489E+00 | 3.068534E+00 | -1.055020E+01 | 2.548912E+01 | -3.823605E+01 | 2.147877E+01 | 1.171523E+00 |
| 41 | -2.577123E+02 | 0.000000E+00 | -1.030747E+00 | -1.781299E+00 | 6.473514E+00 | 6.466998E+00 | -6.955600E+01 | 1.300873E+02 | -7.602417E+01 |
| 42 | -1.104448E+01 | 0.000000E+00 | -4.368540E-01 | -8.930414E-01 | 6.279838E+00 | -1.787474E+01 | 2.762568E+01 | -2.206679E+01 | 7.149436E+00 |
| 51 | -1.473980E+00 | 0.000000E+00 | 5.011756E-01 | -1.761918E+00 | 4.318704E+00 | -2.401495E+00 | -3.223698E+00 | 4.446403E+00 | -1.492399E+00 |
| 52 | -4.209436E+00 | 0.000000E+00 | -1.113714E+00 | 2.360401E+00 | -2.123707E+00 | -4.120726E-01 | 1.418996E+00 | -1.363749E+00 | 4.417750E-01 |
| 61 | -8.605605E-02 | 0.000000E+00 | -5.423224E-01 | 7.781943E-01 | -1.393175E+00 | 1.704602E+00 | -1.243880E+00 | 4.839056E-01 | -7.871792E-02 |
| 62 | -6.396094E+00 | 0.000000E+00 | -1.724594E-01 | 1.320794E-01 | -1.798955E-01 | 1.991458E-01 | -1.238168E-01 | 3.873517E-02 | -4.901527E-03 | third embodiment

FIG.16 fourth embodiment system focal length =2.110mm, half field-of-view =37.798°, F-number =2.336, system length =3.271mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| first lens element 3 | object-side surface 31 | 2.296608418 | 0.575147225 | 1.544101969 | 56.11429148 | 2.173522327 |
| | image-side surface 32 | -2.238011388 | 0.059994399 | | | |
| second lens element 4 | object-side surface 41 | 3.441106567 | 0.199995214 | 1.642830028 | 22.43731776 | -9.719742408 |
| | image-side surface 42 | 2.174368235 | 0.424209884 | | | |
| third lens element 5 | object-side surface 51 | -0.43220027 | 0.220874003 | 1.544101969 | 56.11429148 | -159.1436602 |
| | image-side surface 52 | -0.508445002 | 0.059999204 | | | |
| fourth lens element 6 | object-side surface 61 | 1.235773018 | 0.807960869 | 1.531160165 | 56.04382797 | 8.804529957 |
| | image-side surface 62 | 1.296339152 | 0.22 | | | |
| optical filter 9 | object-side surface 91 | ∞ | 0.3 | 1.516800035 | 64.16733624 | |
| | image-side surface 92 | ∞ | 0.415233733 | | | |
| image plane 100 | | ∞ | | | | |

FIG. 19

| surface | K | a2 | a4 | a6 | a8 | a10 | a12 | a14 | a16 |
|---|---|---|---|---|---|---|---|---|---|
| 31 | 1.545103E+01 | 0.000000E+00 | -3.513978E-01 | -8.908134E-01 | 2.711985E+00 | -2.026292E+01 | -1.169134E+01 | 3.073881E+02 | -7.431150E+02 |
| 32 | -3.181936E+00 | 0.000000E+00 | -1.447752E+00 | 4.703358E+00 | -1.515363E+01 | 3.186501E+01 | -3.804407E+01 | 1.267167E+01 | 6.823085E+00 |
| 41 | -2.577123E+02 | 0.000000E+00 | -7.145448E-01 | -8.741816E-02 | 3.536530E+00 | -8.216858E+00 | 5.335337E+00 | 1.370628E+01 | -2.012083E+01 |
| 42 | -1.104448E+01 | 0.000000E+00 | -5.431109E-06 | -7.650086E-01 | 1.331641E+00 | -7.359963E-01 | 3.982043E-01 | -3.832251E+00 | 3.636783E+00 |
| 51 | -1.473980E+00 | 0.000000E+00 | 1.390986E+00 | -3.923410E+00 | 1.030749E+01 | -1.037101E+01 | 5.642523E+00 | -1.253091E+01 | 1.160723E+01 |
| 52 | -4.209436E+00 | 0.000000E+00 | -1.609758E+00 | 6.987324E+00 | -1.662272E+01 | 1.789901E+01 | 2.342171E+01 | -6.773713E+01 | 3.989449E+01 |
| 61 | -8.605605E-02 | 0.000000E+00 | -5.615631E-01 | 4.406424E-01 | -3.529358E-01 | 1.462271E-01 | -1.755539E-02 | -1.855612E-03 | -4.484673E-03 |
| 62 | -6.396094E+00 | 0.000000E+00 | -1.524302E-01 | 1.902241E-01 | -2.119493E-01 | 1.416906E-01 | -5.568549E-02 | 1.190617E-02 | -1.110223E-03 | fourth embodiment

FIG.20 fifth embodiment system focal length =2.108mm, half field-of-view =38.915°, F-number =2.248, system length =3.344mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| | | ∞ | 0.02 | | | |
| first lens element 3 | object-side surface 31 | 2.361892943 | 0.466071548 | 1.544101969 | 56.11429148 | 2.750776464 |
| | image-side surface 32 | -3.836422894 | 0.230905483 | | | |
| second lens element 4 | object-side surface 41 | 3.776612628 | 0.194441612 | 1.642830028 | 22.43731776 | -17.14826344 |
| | image-side surface 42 | 2.760039198 | 0.304176839 | | | |
| third lens element 5 | object-side surface 51 | -0.633435272 | 0.398269184 | 1.544101969 | 56.11429148 | 4.528085892 |
| | image-side surface 52 | -0.61619108 | 0.059253295 | | | |
| fourth lens element 6 | object-side surface 61 | 1.241359916 | 0.583093061 | 1.531160165 | 56.04382797 | -89.43226984 |
| | image-side surface 62 | 1.012288206 | 0.22 | | | |
| optical filter 9 | object-side surface 91 | ∞ | 0.3 | 1.516800035 | 64.16733624 | |
| | image-side surface 92 | ∞ | 0.58313275 | | | |
| image plane 100 | | ∞ | | | | |

FIG. 23

| | | | | | fifth embodiment | | | | | |
|---|---|---|---|---|---|---|---|---|---|---|
| surface | K | a2 | a4 | a6 | a8 | a10 | a12 | a14 | a16 |
| 31 | 1.545103E+01 | 0.000000E+00 | -3.941790E-01 | 4.718595E-01 | -1.141293E+01 | 6.590446E+01 | -2.723831E+02 | 6.216522E+02 | -7.045248E+02 |
| 32 | -3.181936E+00 | 0.000000E+00 | -6.804033E-01 | 5.133714E-01 | -3.274048E+00 | 1.272673E+01 | -3.345630E+01 | 4.603501E+01 | -2.842763E+01 |
| 41 | -2.577123E+02 | 0.000000E+00 | -3.961707E-01 | -2.514678E+00 | 2.355098E+00 | 1.545181E+01 | -5.454584E+01 | 8.337249E+01 | -5.043068E+01 |
| 42 | -1.104448E+01 | 0.000000E+00 | -2.263962E-01 | -1.499178E+00 | 6.784333E+00 | -1.636524E+01 | 2.541620E+01 | -2.282003E+01 | 8.529296E+00 |
| 51 | -1.473980E+00 | 0.000000E+00 | 5.616145E-01 | -1.782471E+00 | 5.137566E+00 | -3.413949E+00 | -3.933217E+00 | 6.138720E+00 | -2.234169E+00 |
| 52 | -4.209436E+00 | 0.000000E+00 | -1.301385E+00 | 2.875208E+00 | -3.317518E+00 | -2.480222E+00 | 1.452892E+01 | -1.505834E+01 | 4.799714E+00 |
| 61 | -8.605605E-02 | 0.000000E+00 | -4.962010E-01 | 4.540668E-01 | -6.516780E-01 | 7.586858E-01 | -6.390447E-01 | 3.063716E-01 | -6.604244E-02 |
| 62 | -6.396094E+00 | 0.000000E+00 | -1.486895E-01 | 1.297501E-01 | -1.355751E-01 | 9.517446E-02 | -4.307057E-02 | 1.046961E-02 | -1.109147E-03 |

FIG.24

| sixth embodiment | | | | | |
|---|---|---|---|---|---|
| system focal length =2.112mm, half field-of-view =38.239°, F-number =2.395, system length =3.430mm | | | | | |
| lens element | surface | radius of curvature | thickness/ air gap | refractive index | Abbe number | focal length |
| object | | ∞ | 600 | | | |
| | | ∞ | 0.21 | | | |
| aperture stop 2 | | | 0.02 | | | |
| first lens element 3 | object-side surface 31 | 2.305609712 | 0.373377378 | 1.544101969 | 56.11429148 | 4.010635881 |
| | image-side surface 32 | -41.01736602 | 0.113838586 | | | |
| second lens element 4 | object-side surface 41 | 2.352084064 | 0.421942915 | 1.642830028 | 22.43731776 | 35.78193694 |
| | image-side surface 42 | 2.433026132 | 0.291661576 | | | |
| third lens element 5 | object-side surface 51 | -0.853434108 | 0.440373643 | 1.544101969 | 56.11429148 | 1.975648377 |
| | image-side surface 52 | -0.563265331 | 0.0599985 | | | |
| fourth lens element 6 | object-side surface 61 | 1.74104452 | 0.492615445 | 1.531160165 | 56.04382797 | -3.302809484 |
| | image-side surface 62 | 0.789150982 | 0.22 | | | |
| optical filter 9 | object-side surface 91 | ∞ | 0.3 | 1.516800035 | 64.16733624 | |
| | image-side surface 92 | ∞ | 0.715816418 | | | |
| image plane 100 | | ∞ | | | | |

FIG. 27 sixth embodiment

| surface | K | a2 | a4 | a6 | a8 | a10 | a12 | a14 | a16 |
|---|---|---|---|---|---|---|---|---|---|
| 31 | 1.545103E+01 | 0.000000E+00 | -6.356565E-01 | 6.013109E+00 | -8.652442E+01 | 6.388578E+02 | -2.779828E+03 | 6.465033E+03 | -6.377124E+03 |
| 32 | -3.181936E+00 | 0.000000E+00 | -7.377282E-01 | -3.786844E+00 | 3.709502E+01 | -1.960084E+02 | 5.930095E+02 | -9.557769E+02 | 6.189058E+02 |
| 41 | -2.577123E+02 | 0.000000E+00 | 7.294082E-01 | -1.338597E+01 | 7.761078E+01 | -2.973663E+02 | 7.237447E+02 | -9.788032E+02 | 5.527157E+02 |
| 42 | -1.104448E+01 | 0.000000E+00 | 1.489037E-01 | -1.149083E+00 | 2.407386E+00 | -3.473534E+00 | 4.778456E+00 | -6.192142E+00 | 3.441272E+00 |
| 51 | -1.473980E+00 | 0.000000E+00 | 4.586995E-01 | 1.255173E-01 | -3.644219E+00 | 1.319840E+01 | -2.134182E+01 | 1.701407E+01 | -5.435045E+00 |
| 52 | -4.209436E+00 | 0.000000E+00 | -1.260682E+00 | 4.378757E+00 | -1.240574E+01 | 2.502352E+01 | -3.327343E+01 | 2.790455E+01 | -1.038423E+01 |
| 61 | -8.605605E-02 | 0.000000E+00 | -2.191480E-01 | -2.662988E-01 | 7.357045E-01 | -9.381482E-01 | 6.767859E-01 | -2.701269E-01 | 4.446640E-02 |
| 62 | -6.396094E+00 | 0.000000E+00 | -2.179011E-01 | 2.434195E-01 | -3.155162E-01 | 2.728187E-01 | -1.436114E-01 | 4.093244E-02 | -4.854293E-03 |

FIG.28 seventh embodiment system focal length =2.109mm, half field-of-view =38.392°, F-number =2.345, system length =3.555mm

| lens element | surface | radius of curvature | thickness/ air gap | refractive index | Abbe number | focal length |
|---|---|---|---|---|---|---|
| object | | ∞ | 600 | | | |
| aperture stop 2 | | ∞ | 0.21 | | | |
| | | ∞ | 0.02 | | | |
| first lens element 3 | object-side surface 31 | 2.4077789645 | 0.619495093 | 1.544101969 | 56.11429148 | 2.484899988 |
| | image-side surface 32 | -2.825054914 | 0.100231951 | | | |
| second lens element 4 | object-side surface 41 | 2.911080497 | 0.202584174 | 1.642830028 | 22.43731776 | -14.13665607 |
| | image-side surface 42 | 2.148565098 | 0.406520497 | | | |
| third lens element 5 | object-side surface 51 | -0.553308525 | 0.367044325 | 1.544101969 | 56.11429148 | 10.0903945 |
| | image-side surface 52 | -0.620594844 | 0.059867196 | | | |
| fourth lens element 6 | object-side surface 61 | 1.3254400377 | 0.787824631 | 1.531160165 | 56.04382797 | 12.50323257 |
| | image-side surface 62 | 1.31270249 | 0.22 | | | |
| optical filter 9 | object-side surface 91 | ∞ | 0.3 | 1.516800035 | 64.16733624 | |
| | image-side surface 92 | ∞ | 0.49114286 | | | |
| image plane 100 | | ∞ | | | | |

FIG. 31

| surface | K | a2 | a4 | a6 | a8 | a10 | a12 | a14 | a16 |
|---|---|---|---|---|---|---|---|---|---|
| | | | | seventh embodiment | | | | | |
| 31 | 1.545103E+01 | 0.000000E+00 | -3.722163E-01 | 9.928715E-01 | -1.392249E+01 | 6.657923E+01 | -1.884717E+02 | 2.242819E+02 | -1.036575E+02 |
| 32 | -3.181936E+00 | 0.000000E+00 | -1.261696E+00 | 3.124245E+00 | -9.230791E+00 | 2.282499E+01 | -3.952612E+01 | 2.826445E+01 | 7.127735E-01 |
| 41 | -2.577123E+02 | 0.000000E+00 | -7.862882E-01 | -1.433338E+00 | 6.823947E+00 | 4.886958E+00 | -7.090206E+01 | 1.313458E+02 | -7.512346E+01 |
| 42 | -1.104448E+01 | 0.000000E+00 | -4.052136E-01 | -3.799677E-01 | 5.663788E+00 | -1.826472E+01 | 2.781414E+01 | -2.162663E+01 | 7.097471E+00 |
| 51 | -1.473980E+00 | 0.000000E+00 | 2.842074E-01 | -1.299927E+00 | 4.309345E+00 | -2.615978E+00 | -3.374358E+00 | 4.472121E+00 | -1.316922E+00 |
| 52 | -4.209436E+00 | 0.000000E+00 | -1.297384E+00 | 2.626171E+00 | -2.110920E+00 | -3.944546E+00 | 1.416193E+01 | -1.379032E+01 | 4.399864E+00 |
| 61 | -8.605605E-02 | 0.000000E+00 | -4.259688E-01 | 6.276611E-01 | -1.216294E+00 | 1.576935E+00 | -1.236471E+00 | 5.187442E-01 | -9.089710E-02 |
| 62 | -6.396094E+00 | 0.000000E+00 | -1.391536E-01 | 1.743509E-01 | -2.561396E-01 | 2.339608E-01 | -1.244565E-01 | 3.450746E-02 | -3.890666E-03 |

FIG.32 eighth embodiment system focal length =2.108mm, half field-of-view =39.018°, F-number =2.239, system length =3.526mm

| lens element | surface | radius of curvature | thickness/ air gap | refractive index | Abbe number | focal length |
|---|---|---|---|---|---|---|
| object | | ∞ | 600 | | | |
| | | ∞ | 0.21 | | | |
| aperture stop 2 | | | 0.02 | | | |
| first lens element 3 | object-side surface 31 | 2.586733675 | 0.642925666 | 1.544101969 | 56.11429148 | 2.425310178 |
| | image-side surface 32 | -2.474470772 | 0.142819066 | | | |
| second lens element 4 | object-side surface 41 | 3.765072308 | 0.253076057 | 1.642830028 | 22.43731776 | -7.400836519 |
| | image-side surface 42 | 2.053329486 | 0.264359276 | | | |
| third lens element 5 | object-side surface 51 | -0.746828379 | 0.546675546 | 1.544101969 | 56.11429148 | 2.68193977 |
| | image-side surface 52 | -0.622412775 | 0.077744362 | | | |
| fourth lens element 6 | object-side surface 61 | 1.334139248 | 0.509620192 | 1.531160165 | 56.04382797 | -7.381571347 |
| | image-side surface 62 | 0.863950461 | 0.22 | | | |
| optical filter 9 | object-side surface 91 | ∞ | 0.3 | 1.516800035 | 64.16733624 | |
| | image-side surface 92 | ∞ | 0.568304842 | | | |
| image plane 100 | | ∞ | | | | |

FIG. 35 eighth embodiment

| surface | K | a2 | a4 | a6 | a8 | a10 | a12 | a14 | a16 |
|---|---|---|---|---|---|---|---|---|---|
| 31 | 1.545103E+01 | 0.000000E+00 | -3.330387E-01 | 1.008807E+00 | -1.425632E+01 | 6.768355E+01 | -1.801227E+02 | 1.941222E+02 | -7.639558E+01 |
| 32 | -3.181936E+00 | 0.000000E+00 | -1.328885E+00 | 3.376958E+00 | -1.024540E+01 | 2.328474E+01 | -3.692941E+01 | 2.860486E+01 | -8.091652E+00 |
| 41 | -2.577123E+02 | 0.000000E+00 | -1.253188E+00 | -1.464358E+00 | 7.341236E+00 | 5.003621E+00 | -7.208057E+01 | 1.303888E+02 | -7.032755E+01 |
| 42 | -1.104448E+01 | 0.000000E+00 | -6.195075E-01 | -4.006290E-01 | 5.896858E+00 | -1.809403E+01 | 2.776156E+01 | -2.189159E+01 | 7.112629E+00 |
| 51 | -1.473980E+00 | 0.000000E+00 | 4.671442E-01 | -1.593172E+00 | 4.200848E+00 | -2.501494E+00 | -3.165053E+00 | 4.566201E+00 | -1.576784E+00 |
| 52 | -4.209436E+00 | 0.000000E+00 | -1.167307E+00 | 2.450825E+00 | -2.164010E+00 | -3.978911E+00 | 1.416621E+01 | -1.374856E+01 | 4.441052E+00 |
| 61 | -8.605605E-02 | 0.000000E+00 | -5.219531E-01 | 7.525646E-01 | -1.326280E+00 | 1.624258E+00 | -1.232485E+00 | 5.093998E-01 | -8.955710E-02 |
| 62 | -6.396094E+00 | 0.000000E+00 | -1.827724E-01 | 1.992211E-01 | -2.455568E-01 | 2.204803E-01 | -1.222378E-01 | 3.607004E-02 | -4.438206E-03 |

FIG.36

| relationship | first embodiment | second embodiment | third embodiment | fourth embodiment | fifth embodiment | sixth embodiment | seventh embodiment | eighth embodiment |
|---|---|---|---|---|---|---|---|---|
| TTL | 3.199 | 3.254 | 3.589 | 3.271 | 3.344 | 3.430 | 3.555 | 3.526 |
| ALT | 1.739 | 1.735 | 1.986 | 1.792 | 1.647 | 1.728 | 1.977 | 1.952 |
| Gaa | 0.474 | 0.433 | 0.456 | 0.544 | 0.594 | 0.465 | 0.567 | 0.485 |
| BFL | 0.987 | 1.086 | 1.147 | 0.935 | 1.103 | 1.236 | 1.011 | 1.088 |
| G23/G34 | 6.119 | 4.705 | 3.936 | 7.070 | 5.134 | 4.861 | 6.790 | 3.400 |
| G23/T1 | 0.616 | 0.437 | 0.399 | 0.738 | 0.653 | 0.781 | 0.656 | 0.411 |
| G23/T2 | 1.687 | 1.411 | 0.777 | 2.121 | 1.525 | 0.691 | 2.007 | 1.045 |
| G23/T4 | 0.510 | 0.514 | 0.519 | 0.525 | 0.522 | 0.592 | 0.516 | 0.519 |
| Gaa/T1 | 0.819 | 0.671 | 0.779 | 0.946 | 1.275 | 1.247 | 0.915 | 0.754 |
| Gaa/T2 | 2.242 | 2.164 | 1.515 | 2.721 | 2.980 | 1.103 | 2.797 | 1.916 |
| Gaa/T3 | 1.902 | 1.268 | 0.701 | 2.607 | 1.492 | 1.057 | 1.544 | 0.887 |
| ALT/G23 | 4.875 | 6.149 | 8.498 | 4.224 | 5.414 | 5.926 | 4.863 | 7.385 |
| ALT/Gaa | 3.668 | 4.011 | 4.358 | 3.293 | 2.771 | 3.713 | 3.489 | 4.026 |
| BFL/G23 | 2.766 | 3.848 | 4.908 | 2.205 | 3.627 | 4.237 | 2.487 | 4.117 |
| BFL/Gaa | 2.081 | 2.510 | 2.517 | 1.719 | 1.856 | 2.655 | 1.785 | 2.244 |
| Gaa/G23 | 1.329 | 1.533 | 1.950 | 1.283 | 1.954 | 1.596 | 1.394 | 1.834 |
| T1/G23 | 1.623 | 2.286 | 2.505 | 1.356 | 1.532 | 1.280 | 1.524 | 2.432 |
| T3/G23 | 0.699 | 1.209 | 2.780 | 0.492 | 1.309 | 1.510 | 0.903 | 2.068 |
| T3/T1 | 0.431 | 0.529 | 1.110 | 0.363 | 0.855 | 1.179 | 0.592 | 0.850 |
| T3/T2 | 1.179 | 1.707 | 2.161 | 1.044 | 1.997 | 1.044 | 1.812 | 2.160 |
| TTL/G23 | 8.971 | 11.531 | 15.356 | 7.711 | 10.995 | 11.759 | 8.744 | 13.336 |
| TTL/Gaa | 6.749 | 7.520 | 7.875 | 6.011 | 5.627 | 7.368 | 6.274 | 7.270 |

FIG.38

IMAGING LENS AND ELECTRONIC APPARATUS INCLUDING THE SAME

CROSS-REFERENCE TO RELATED APPLICATION

This application claims priority of Chinese Patent Application No. 201510115363.4, filed on Mar. 17, 2015.

FIELD

The disclosure relates to an imaging lens and an electronic apparatus including the same.

BACKGROUND

In recent years, as portable electronic devices (e.g., mobile phones and digital cameras) become ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance. Imaging quality and size are two of the most important characteristics of imaging lenses.

The design of the optical imaging lens having good imaging quality and miniaturized size, does not simply reside in reducing dimensions of an imaging lens with good imaging quality. The design process involves considering properties/characteristics of the materials, and practicality problems such as its assembly yield.

Therefore, greater technical difficulties are encountered for a miniaturized imaging lens than for traditional imaging lenses. Producing an imaging lens that meets requirements of consumer electronic products while having satisfactory optical performance is always a goal in the industry.

SUMMARY

Therefore, an object of the disclosure is to provide an imaging lens having a shorter overall length while maintaining good optical performance.

According to one aspect of the disclosure, an imaging lens includes an aperture stop, a first lens element, a second lens element, a third lens element and a fourth lens element arranged in order from an object side to an image side along an optical axis of the imaging lens. Each of the first lens element, the second lens element, the third lens element and the fourth lens element has an object-side surface facing toward the object side, and an image-side surface facing toward the image side.

The image-side surface of the first lens element has a convex portion in a vicinity of the optical axis. The object-side surface of the second lens element has a convex portion in a vicinity of the optical axis, and the image-side surface of the second lens element has a convex portion in a vicinity of a periphery of the second lens element. The image-side surface of the third lens element has a concave portion in a vicinity of a periphery of the third lens element. The image-side surface of the fourth lens element has a concave portion in a vicinity of the optical axis, and a convex portion in a vicinity of a periphery of the fourth lens element.

The imaging lens does not include any lens element with refractive power other than the first lens element, the second lens element, the third lens element and the fourth lens element.

Another object of the disclosure is to provide an electronic apparatus including an imaging lens with four lens elements.

According to another aspect of the disclosure, an electronic apparatus includes a housing and an imaging module. The imaging module is disposed in the housing, and includes the imaging lens of this disclosure, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the disclosure will become apparent in the following detailed description of the embodiments with reference to the accompanying drawings, of which:

FIG. 3 is a schematic diagram to illustrate surface shape and structure of a first exemplary lens element;

FIG. 4 is a schematic diagram to illustrate surface shape and structure of a second exemplary lens element;

FIG. 5 is a schematic diagram to illustrate surface shape and structure of a third exemplary lens element;

FIG. 7 shows values of some optical data corresponding to the imaging lens of the first embodiment;

FIG. 8 shows values of some aspherical coefficients corresponding to the imaging lens of the first embodiment;

FIG. 11 shows values of some optical data corresponding to the imaging lens of the second embodiment;

FIG. 12 shows values of some aspherical coefficients corresponding to the imaging lens of the second embodiment;

FIG. 15 shows values of some optical data corresponding to the imaging lens of the third embodiment;

FIG. 16 shows values of some aspherical coefficients corresponding to the imaging lens of the third embodiment;

FIG. 19 shows values of some optical data corresponding to the imaging lens of the fourth embodiment;

FIG. 20 shows values of some aspherical coefficients corresponding to the imaging lens of the fourth embodiment;

FIG. 23 shows values of some optical data corresponding to the imaging lens of the fifth embodiment;

FIG. 24 shows values of some aspherical coefficients corresponding to the imaging lens of the fifth embodiment;

FIG. 27 shows values of some optical data corresponding to the imaging lens of the sixth embodiment;

FIG. 28 shows values of some aspherical coefficients corresponding to the imaging lens of the sixth embodiment;

FIG. 31 shows values of some optical data corresponding to the imaging lens of the seventh embodiment;

FIG. 32 shows values of some aspherical coefficients corresponding to the imaging lens of the seventh embodiment;

FIG. 35 shows values of some optical data corresponding to the imaging lens of the eighth embodiment;

FIG. 36 shows values of some aspherical coefficients corresponding to the imaging lens of the eighth embodiment;

FIG. 38 is a table that list values of relationships among some lens parameters corresponding to the imaging lenses of the first to eighth embodiments;

DETAILED DESCRIPTION

Figure 2:
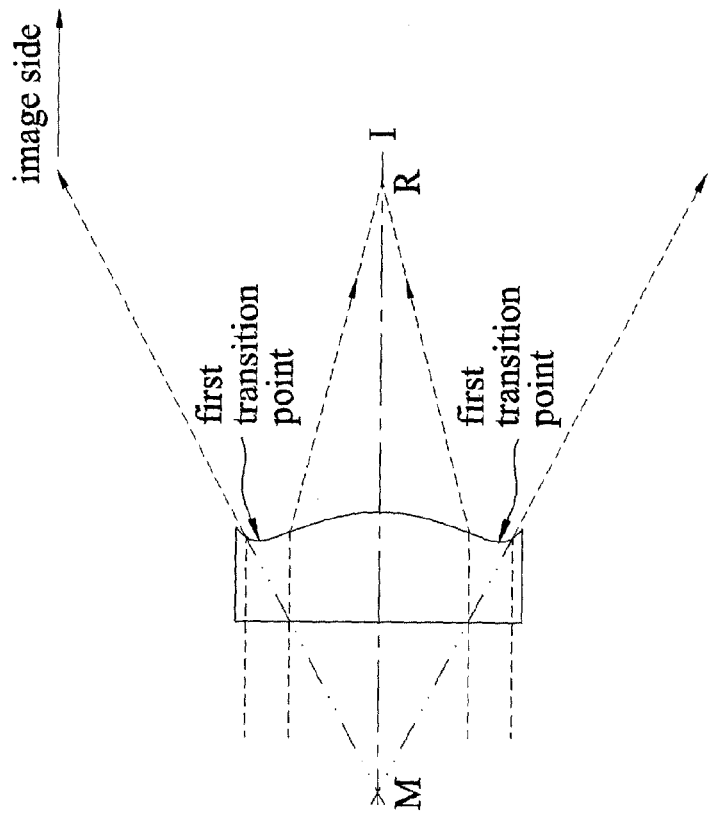
FIG. 2 is a schematic diagram to illustrate concave and convex portions and a focal point of a lens element.

Before the disclosure is described in greater detail, it should be noted that like elements are denoted by the same reference numerals throughout the disclosure.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element through which imaging rays are capable of passing, namely the clear aperture of the surface. The aforementioned imaging rays can be classified into two types, chief rays (Lc) and marginal rays (Lm). Taking a lens element depicted in FIG. 1 as an example, the lens element is rotationally symmetric, where the optical axis (I) is the axis of symmetry. The region (A) of the lens element is defined as "a portion in a vicinity of the optical axis (I)", and the region (C) of the lens element is defined as "a portion in a vicinity of a periphery of the lens element". Besides, the lens element may also have an extending portion (E) extended radially and outwardly from the region (C), namely the portion outside of the clear aperture of the lens element. The extending portion (E) is usually used for physically assembling the lens element into an optical imaging lens system. Under normal circumstances, the imaging rays would not pass through the extending portion (E) and only pass through the clear aperture. The structures and shapes of the aforementioned extending portion (E) are only examples for technical explanation, and the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in the vicinity of the optical axis (I), the portion in the vicinity of the periphery of a lens element surface, and other types of lens element surfaces such as those having multiple portions.

Figure 1:
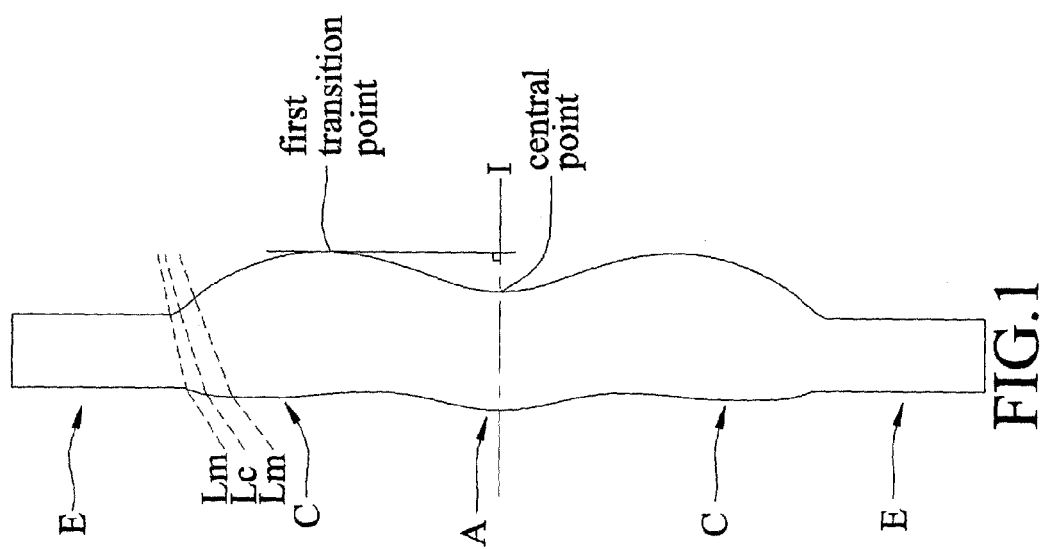
FIG. 1 is a schematic diagram to illustrate surface shape and structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis (I). The transition point is a point on a surface of a lens element, where the tangent line of that point is perpendicular to the optical axis (I). Additionally, if multiple transition points appear on one single surface, then these transition points are sequentially named along the radial direction of the surface with numbers starting from the first transition point. For instance, these transition points may be the first transition point (closest one to the optical axis (I)), the second transition point, and the $N^{th}$ transition point (the farthest one from the optical axis (I) within the scope of the clear aperture of the surface). The portion of a surface of a lens element between the central point and the first transition point is defined as the portion in the vicinity of the optical axis (I). The portion located radially outside of the $N^{th}$ transition point (but still within the scope of the clear aperture) is defined as the portion in the vicinity of the periphery of the lens element. In some embodiments, there are other portions existing between the portion in the vicinity of the optical axis (I) and the portion in the vicinity of the periphery of the lens element; the number of portions depends on the number of the transition point (s). In addition, the radius of the clear aperture (or a so-called effective radius) of a surface is defined as the radial distance from the optical axis (I) to a point of intersection of the marginal ray (Lm) and the surface of the lens element.

2. Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bent and the ray itself or its extension line will eventually meet the optical axis (I). The shape of that portion can be determined by whether the ray or its extension line meets (intersects) the optical axis (I) (focal point) at the object-side or image-side. For instance, if the ray itself intersects the optical axis (I) at the image side of the lens element after passing through a portion, i.e., the focal point of this ray is at the image side (see point R in FIG. 2), the portion will be determined as having a convex shape. On the contrary, if the ray diverges after passing through a portion, and the extension line of the ray intersects the optical axis (I) at the object side of the lens element, i.e., the focal point of the ray is at the object side (see point (M) in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent with that by using the other way mentioned above, which determines surface shapes by referring to whether the focal point of a collimated ray is at the object side or the image side.

3. For none transition point cases, the portion in the vicinity of the optical axis is defined as the portion between 0~50% of the effective radius (radius of the clear aperture) of the surface, whereas the portion in the vicinity of the periphery of the lens element is defined as the portion between 50~100% of the effective radius (the radius of the clear aperture) of the surface.

Referring to the first example depicted in FIG. 3, only one transition point, namely a first transition point, appears within the clear aperture of the image-side surface of the lens element. Portion (i) is a portion in the vicinity of the optical axis, and portion (ii) is a portion in the vicinity of the periphery of the lens element. The portion in the vicinity of the optical axis (I) is determined as having a concave surface due to the R value at the image-side surface of the lens element being positive. The shape of the portion in the vicinity of the periphery of the lens element is different from that of the radially inner adjacent portion, i.e., the shape of the portion in the vicinity of the periphery of the lens element is different from the shape of the portion in the vicinity of the optical axis (I); the portion in the vicinity of the periphery of the lens element has a convex shape.

Referring to the second example depicted in FIG. 4, a first transition point and a second transition point exist on the object-side surface (within the clear aperture) of a lens element. In the second example, portion (i) is the portion in the vicinity of the optical axis (I), and portion (iii) is the portion in the vicinity of the periphery of the lens element. The portion in the vicinity of the optical axis (I) has a convex shape because the R value at the object-side surface of the lens element is positive. The portion in the vicinity of the periphery of the lens element (portion iii) has a convex shape. Furthermore, there is another portion having a concave shape existing between the first and second transition points (portion (ii)).

Referring to a third example depicted in FIG. 5, no transition point exists on the object-side surface of the lens element. In this case, the portion between 0~50% of the effective radius (the radius of the clear aperture) is determined as the portion in the vicinity of the optical axis (I), and the portion between 50~100% of the effective radius is determined as the portion in the vicinity of the periphery of the lens element. The portion in the vicinity of the optical axis (I) of the object-side surface of the lens element is determined as having a convex shape due to its positive R value, and the portion in the vicinity of the periphery of the lens element is determined as having a convex shape as well.

Figure 6:
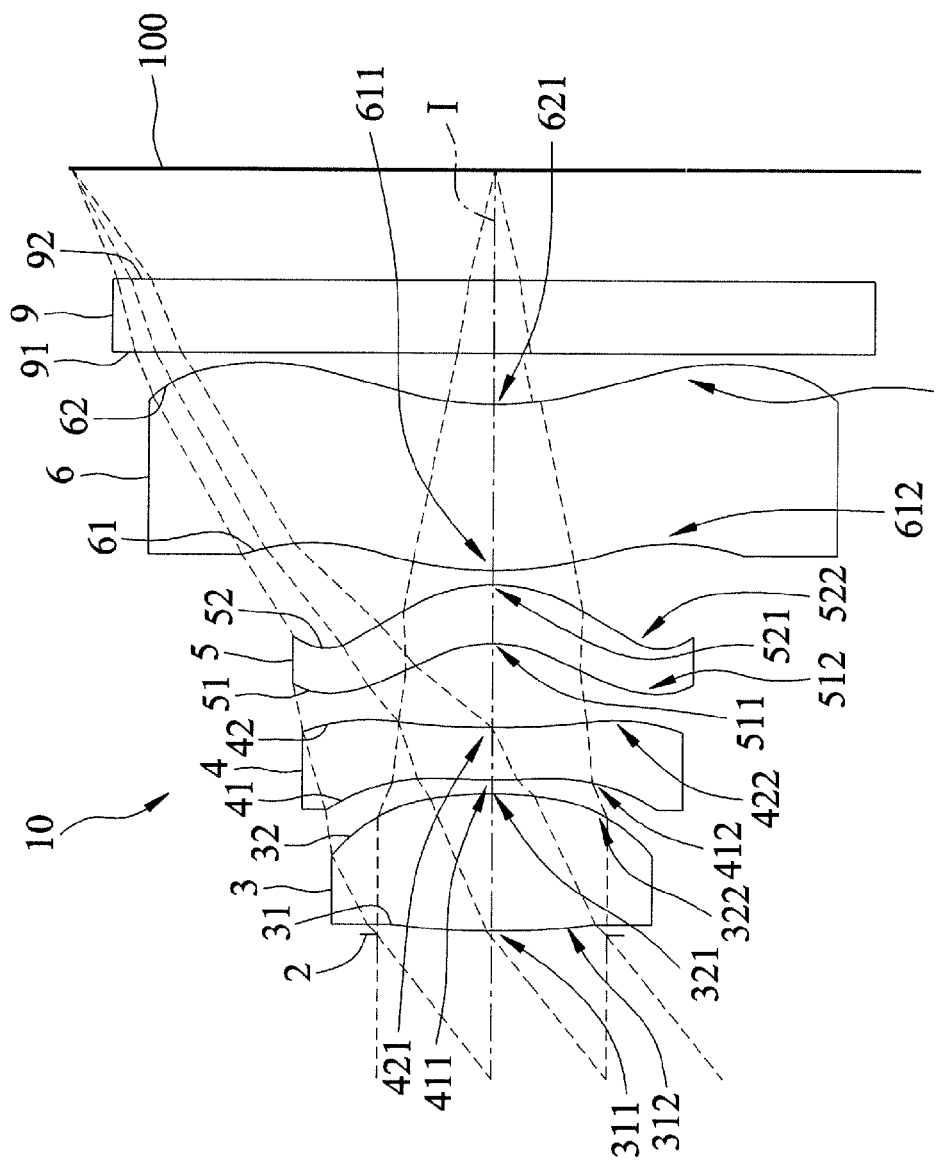
FIG. 6 is a schematic diagram that illustrates the first embodiment of an imaging lens according to the disclosure.

Referring to FIG. 6, the first embodiment of an imaging lens 10 according to the present disclosure includes an aperture stop 2, a first lens element 3, a second lens element 4, a third lens element 5, a fourth lens element 6 and an optical filter 9 arranged in the given order from an object side to an image side along an optical axis (I) of the imaging lens 10. The optical filter 9 is an infrared cut filter for selectively absorbing infrared light to thereby reduce imperfection of images formed at an image plane 100. In further detail, the object side refers to the side of an object to be photographed, and the image side refers to the side of the image plane 100.

Each of the first, second, third and fourth lens elements 3-6 and the optical filter 9 has an object-side surface 31, 41, 51, 61, 91 facing toward the object side, and an image-side surface 32, 42, 52, 62, 92 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 91, 92 of the optical filter 9, in the given order, to form an image on the image plane 100. In this embodiment, each of the object-side surfaces 31, 41, 51, 61, and the image-side surfaces 32, 42, 52, 62, is aspherical and has a center point coinciding with the optical axis (I).

Each of the lens elements 3-6 is made of a plastic material and has a refractive power in this embodiment. However, at least one of the lens elements 3-6 may be made of other materials in other embodiments.

In the first embodiment, which is depicted in FIG. 6, the first lens element 3 has a positive refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 is a convex surface that has a convex portion 321 in a vicinity of the optical axis (I), and a convex portion 322 in a vicinity of the periphery of the first lens element 3.

The second lens element 4 has a negative refractive power. The object-side surface 41 of the second lens element 4 has a convex portion 411 in a vicinity of the optical axis (I), and a concave portion 412 in a vicinity of a periphery of the second lens element 4. The image-side surface 42 has a concave portion 421 in a vicinity of the optical axis (I), and a convex portion 422 in a vicinity of the periphery of the second lens element 4.

The third lens element 5 has a negative refractive power. The object-side surface 51 of the third lens element 5 has a concave portion 511 in a vicinity of the optical axis (I), and a convex portion 512 in a vicinity of a periphery of the third lens element 5. The image-side surface 52 of the third lens element 5 has a convex portion 521 in a vicinity of the optical axis (I), and a concave portion 522 in a vicinity of the periphery of the third lens element 5.

The fourth lens element 6 has a positive refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

In the first embodiment, the imaging lens 10 does not include any lens element with refractive power other than the aforesaid lens elements 3-6.

Shown in FIG. 7 is a table that lists values of some optical data corresponding to the surfaces 31, 41, 51, 61, 91, 32, 42, 52, 62, and 92, of the first embodiment. The imaging lens 10 has an overall system effective focal length (EFL) of 2.102 mm, a half field-of-view (HFOV) of 39.278°, an F-number of 2.266, and a system length of 3.199 mm. The system length refers to a distance between the object-side surface 31 of the first lens element 3 and the image plane 100 at the optical axis (I).

In this embodiment, each of the object-side surfaces 31, 41, 51, and 61 and the image-side surfaces 32, 42, 52, and 62 is aspherical, and satisfies the relationship of $$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a 2ith aspherical coefficient.

Shown in FIG. 8 is a table that lists values of some aspherical coefficients of the aforementioned relationship (1) corresponding to the first embodiment. Each of the rows numbered 31, 41, 51, and 61 and 32, 42, 52, and 62 in FIG. 8 lists the aspherical coefficients of a respective one of the object-side surfaces 31, 41, 51, and 61 and the image-side surfaces 32, 42, 52, and 62.

Relationships among some of the lens parameters corresponding to the first embodiment are shown in FIG. 38. Note that some terminologies are defined as follows:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

Gaa represents a sum of the three air gap lengths among the first lens element 3, the second lens element 4, the third lens element 5 and the fourth lens element 6 at the optical axis (I) (i.e., the sum of G12, G23 and G34);

ALT represents a sum of the thicknesses of the first lens element 3, the second lens element 4, the third lens element 5 and the fourth lens element 6 at the optical axis (I) (i.e., the sum of T1, T2, T3 and T4);

TTL represents a distance between the object-side surface 31 of the first lens element 3 and the image plane 100 at the optical axis (I);

BFL represents a distance between the image-side surface 62 of the fourth lens element 6 and the image plane 100 at the optical axis (I); and EFL represents a system focal length of the imaging lens 10.

In addition:

G4F represents an air gap length between the fourth lens element 6 and the optical filter 9 at the optical axis (I);

TF represents a thickness of the optical filter 9 at the optical axis (I);

GFI represents an air gap length between the optical filter 9 and the image plane 100 at the optical axis (I);

f1, f2, f3 and f4 respectively represent focal lengths of the first, second, third and fourth lens elements 3-6;

n1, n2, n3 and n4 respectively represent refractive indices of the first, second, third and fourth lens elements 3-6; and υ1, υ2, υ3 and υ4 respectively represent Abbe numbers of the first, second, third and fourth lens elements 3-6.

FIGS. 9(A) to 9(D) respectively show simulation results corresponding to longitudinal spherical aberration, sagittal astigmatism aberration, tangential astigmatism aberration, and distortion aberration of the first embodiment. In each of the simulation results, curves corresponding respectively to wavelengths of 470 nm, 555 nm, and 650 nm are shown. It can be understood from FIG. 9(A) that, since each of the curves corresponding to longitudinal spherical aberration has a focal length at each field of view (indicated by the vertical axis) that falls within the range of ±0.05 mm, the first embodiment is able to achieve a relatively low spherical aberration at each of the wavelengths. Furthermore, since the curves at each of the wavelengths of 470 nm, 555 nm, and 650 nm are close to each other, the first embodiment has a relatively low chromatic aberration.

Figure 9:
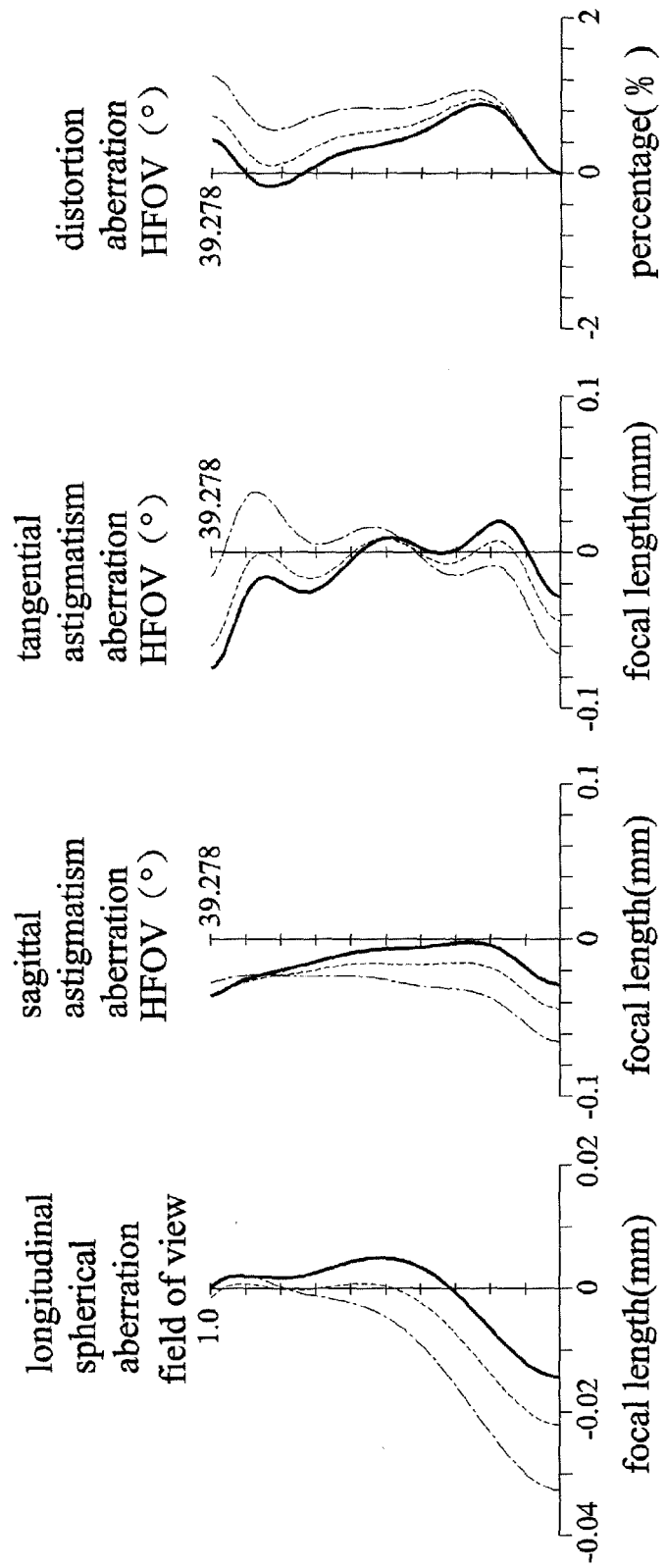
FIGS. 9(A) to 9(D) show different optical characteristics of the imaging lens of the first embodiment.

It can be understood from FIGS. 9(B) and 9(C) that, since each of the curves falls within the range of ±0.2 mm of focal length, the first embodiment has a relatively low optical aberration. Moreover, as shown in FIG. 9(D), since each of the curves corresponding to distortion aberration falls within the range of ±2%, the first embodiment is able to meet requirements in imaging quality of most optical systems. In view of the above, even with the system length reduced down to 3.199 mm, the imaging lens 10 of the first embodiment is still able to achieve a relatively good optical performance.

Figure 10:
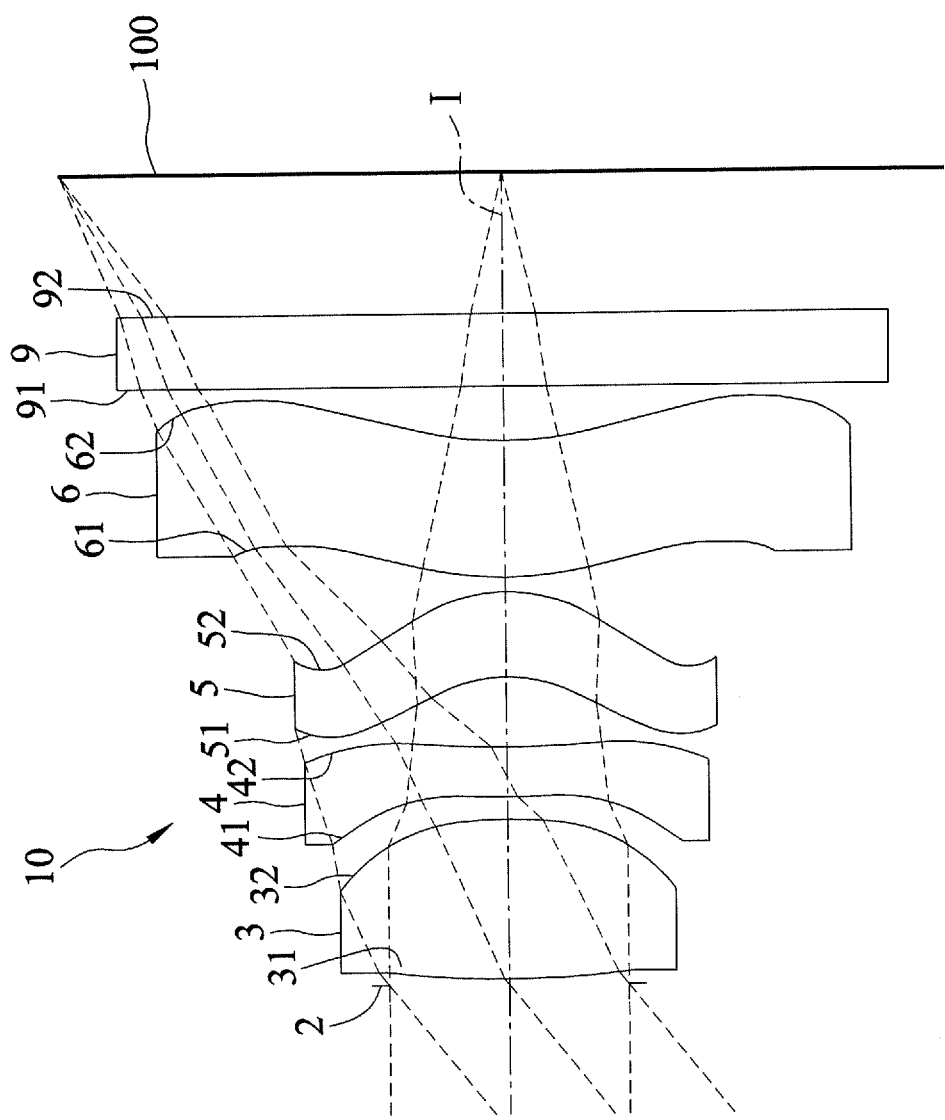
FIG. 10 is a schematic diagram that illustrates the second embodiment of an imaging lens according to the disclosure.
Figure 13:
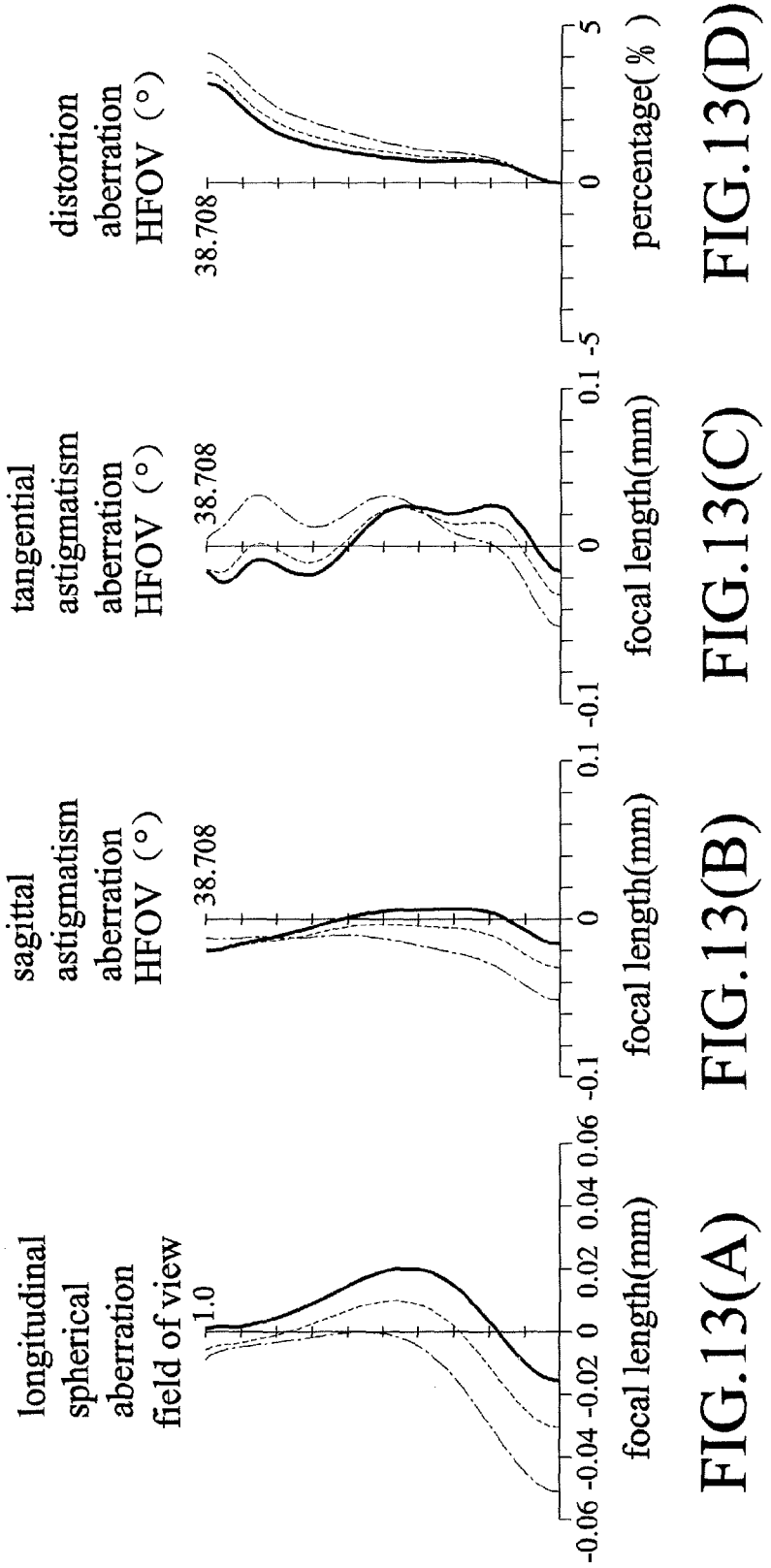
FIGS. 13(A) to 13(D) show different optical characteristics of the imaging lens of the second embodiment.

FIG. 10 illustrates a second embodiment of an imaging lens 10 according to the present disclosure, which has a configuration similar to that of the first embodiment and differs in optical data, aspherical coefficients, and lens parameters of the first, second, third and fourth lens elements 3-6; and that the third lens element 5 has a positive refractive power. It should be noted herein that, in order to clearly illustrate the second embodiment, reference numerals of the convex and concave portions that are the same as those of the first embodiment have been omitted in FIG. 10.

Shown in FIG. 11 is a table that lists values of some optical data corresponding to the surfaces 31, 41, 51, 61, 91, 32, 42, 52, 62, and 92 of the second embodiment. The imaging lens 10 has an overall system focal length of 2.103 mm, an HFOV of 38.708°, an F-number of 2.234, and a system length of 3.254 mm.

Shown in FIG. 12 is a table that lists values of some aspherical coefficients of the aforementioned relationship (1) corresponding to the second embodiment.

Relationships among some of the aforementioned lens parameters corresponding to the second embodiment are shown in FIG. 38.

FIGS. 13(A) to 13(D) respectively show simulation results corresponding to longitudinal spherical aberration, sagittal astigmatism aberration, tangential astigmatism aberration, and distortion aberration of the second embodiment. It can be understood from FIGS. 13(A) to 13(D) that the second embodiment is able to achieve a relatively good optical performance.

Via the aforementioned description, the advantage of the second embodiment in contrast to the first embodiment resides in that the F-number is smaller than that of the first embodiment, and the imaging lens 10 of this embodiment is easier to manufacture, providing higher yield.

Figure 14:
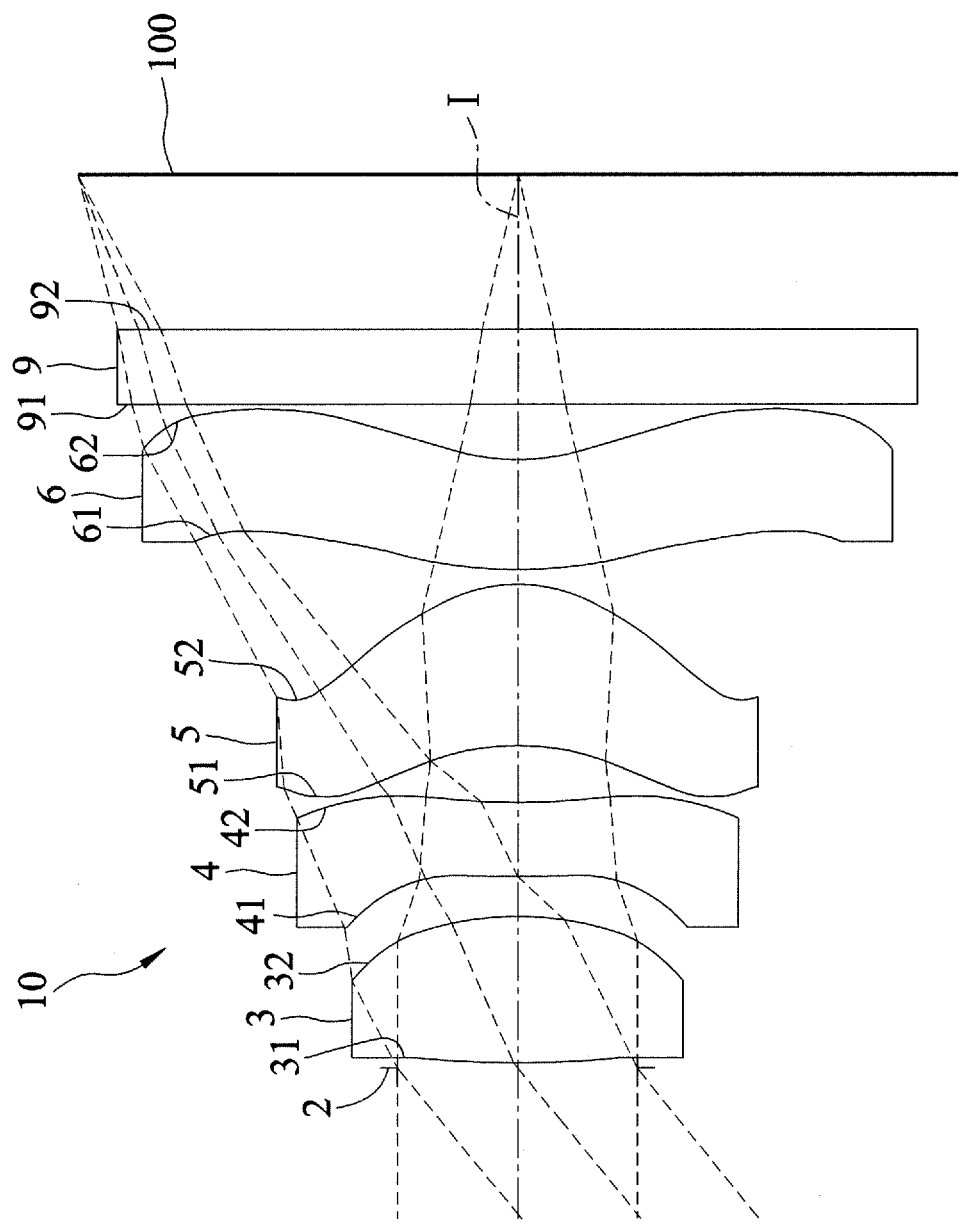
FIG. 14 is a schematic diagram that illustrates the third embodiment of an imaging lens according to the disclosure.
Figures 17A, 17B, 17C, 17D:
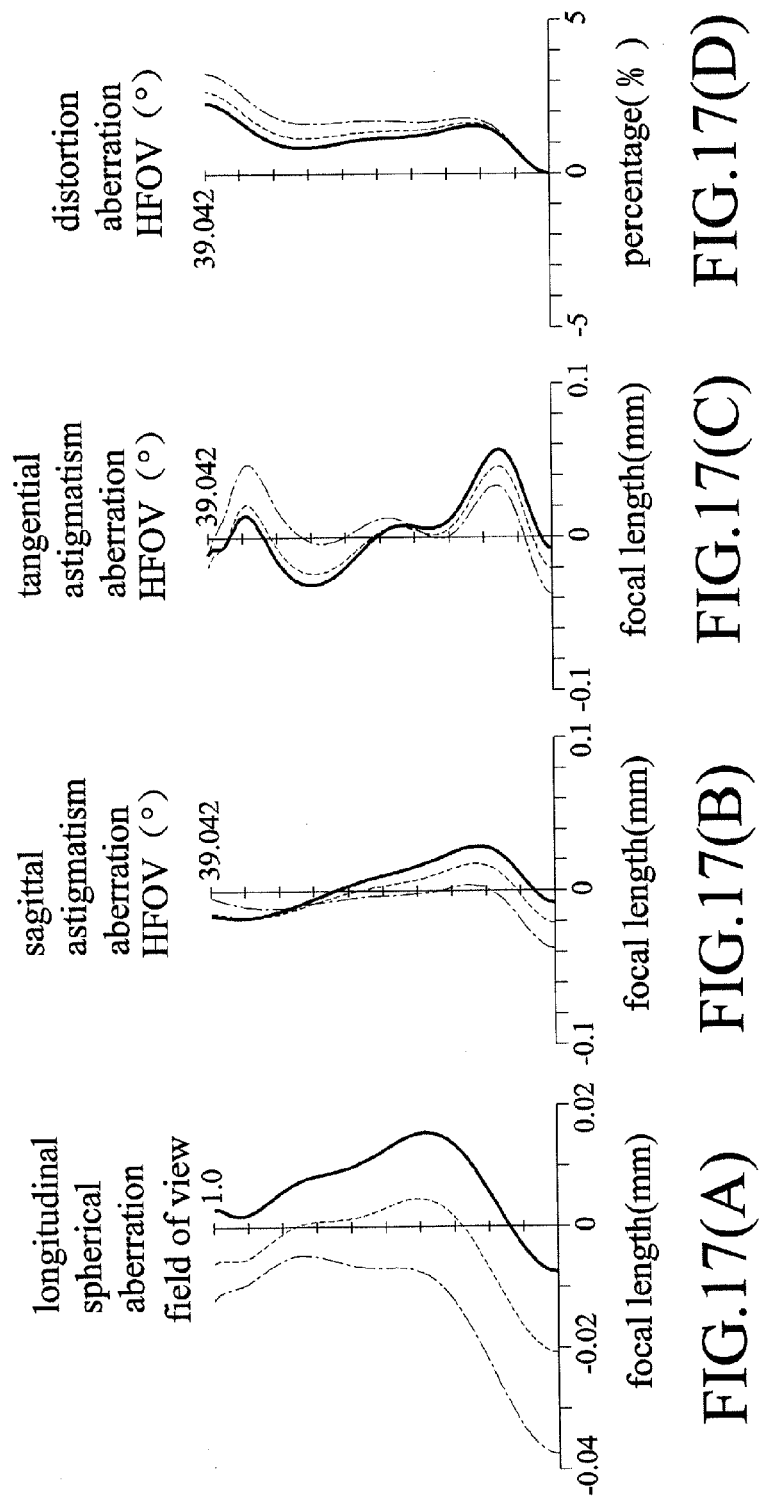
FIGS. 17(A) to 17(D) show different optical characteristics of the imaging lens of the third embodiment.

FIG. 14 illustrates a third embodiment of an imaging lens 10 according to the present disclosure, which has a configuration similar to that of the first embodiment and differs in optical data, aspherical coefficients, and lens parameters of the first, second, third and fourth lens elements 3-6. It should be noted herein that, in order to clearly illustrate the third embodiment, reference numerals of the convex and concave portions that are the same as those of the first embodiment have been omitted in FIG. 14.

Shown in FIG. 15 is a table that lists values of some optical data corresponding to the surfaces 31, 41, 51, 61, 91, 32, 42, 52, 62, and 92 of the third embodiment. The imaging lens 10 has an overall system focal length of 2.108 mm, an HFOV of 39.042°, an F-number of 2.234, and a system length of 3.589 mm.

Shown in FIG. 16 is a table that lists values of some aspherical coefficients of the aforementioned relationship (1) corresponding to the third embodiment.

Relationships among some of the aforementioned lens parameters corresponding to the third embodiment are shown in FIG. 38.

FIGS. 17(A) to 17(D) respectively show simulation results corresponding to longitudinal spherical aberration, sagittal astigmatism aberration, tangential astigmatism aberration, and distortion aberration of the third embodiment. It can be understood from FIGS. 17(A) to 17(D) that the third embodiment is able to achieve a relatively good optical performance.

Via the aforementioned description, the advantage of the third embodiment in contrast to the first embodiment resides in that the F-number is smaller than that of the first embodiment, and the imaging lens 10 of this embodiment is easier to manufacture, providing higher yield.

Figure 18:
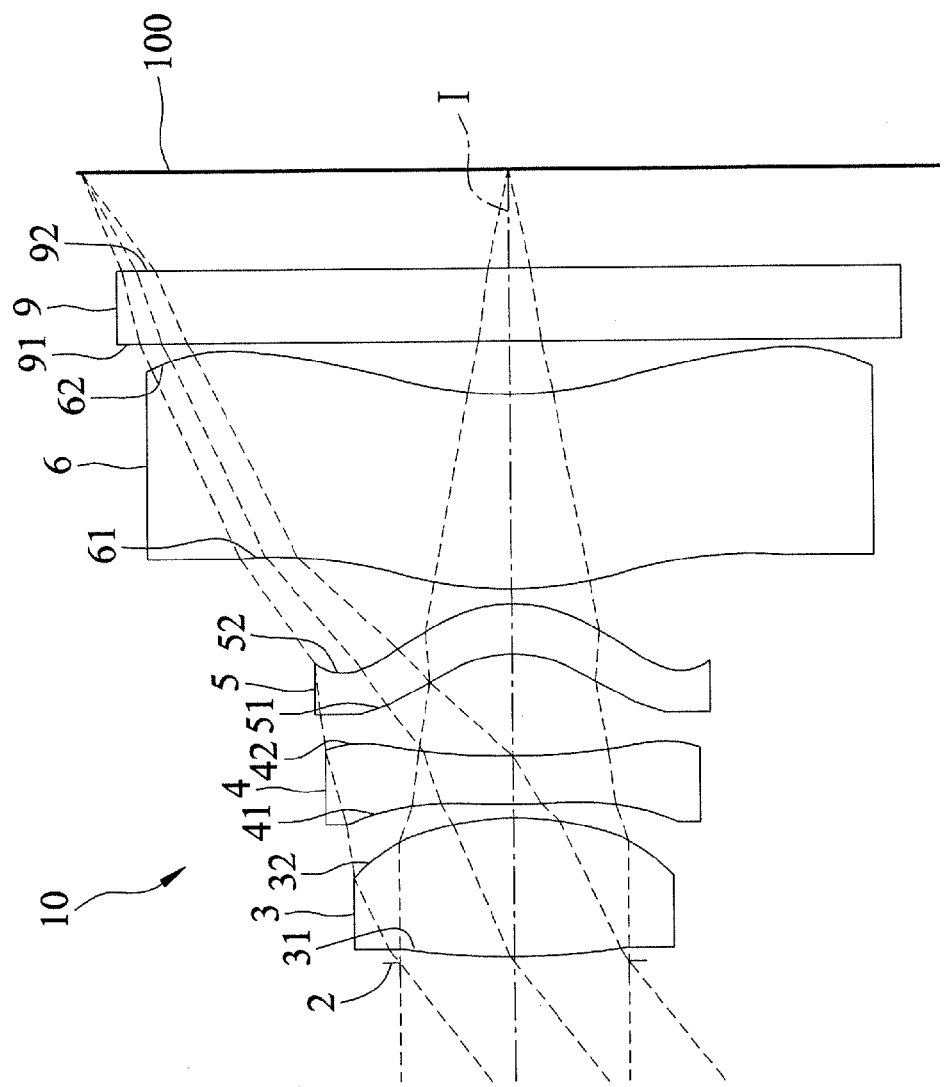
FIG. 18 is a schematic diagram that illustrates the fourth embodiment of an imaging lens according to the disclosure.
Figure 21:
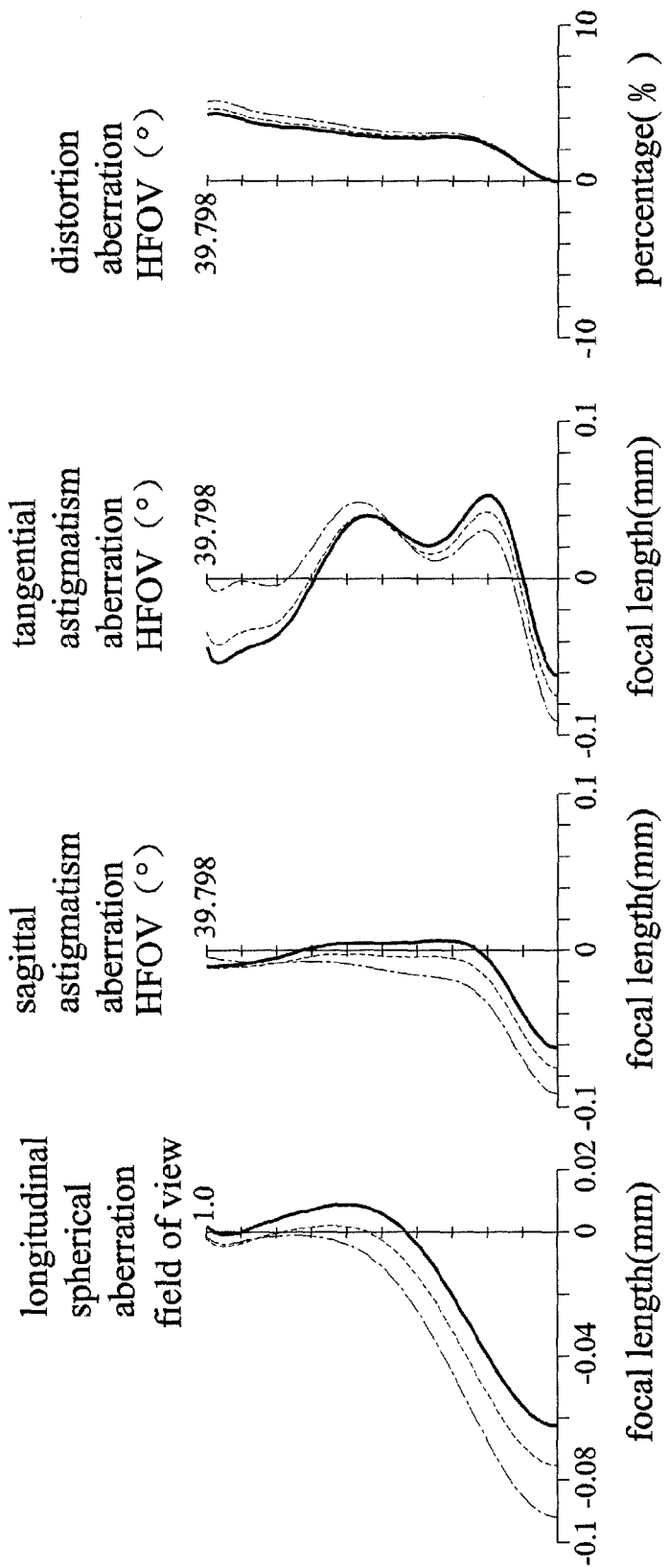
FIGS. 21(A) to 21(D) show different optical characteristics of the imaging lens of the fourth embodiment.

FIG. 18 illustrates a fourth embodiment of an imaging lens 10 according to the present disclosure, which has a configuration similar to that of the first embodiment and differs in optical data, aspherical coefficients, and lens parameters of the first, second, third and fourth lens elements 3-6. It should be noted here in that, in order to clearly illustrate the fourth embodiment, reference numerals of the convex and concave portions that are the same as those of the first embodiment have been omitted in FIG. 18.

Shown in FIG. 19 is a table that lists values of some optical data corresponding to the surfaces 31, 41, 51, 61, 91, 32, 42, 52, 62, and 92 of the fourth embodiment. The imaging lens 10 has an overall system focal length of 2.110 mm, an HFOV of 37.798°, an F-number of 2.336, and a system length of 3.271 mm.

Shown in FIG. 20 is a table that lists values of some aspherical coefficients of the aforementioned relationship (1) corresponding to the fourth embodiment.

Relationships among some of the aforementioned lens parameters corresponding to the fourth embodiment are shown in FIG. 38.

FIGS. 21(A) to 21(D) respectively show simulation results corresponding to longitudinal spherical aberration, sagittal astigmatism aberration, tangential astigmatism aberration, and distortion aberration of the fourth embodiment. It can be understood from FIGS. 21(A) to 21(D) that the fourth embodiment is able to achieve a relatively good optical performance.

Via the aforementioned description, the advantage of the fourth embodiment in contrast to the first embodiment resides in that the imaging lens 10 of the fourth embodiment is easier to manufacture, providing higher yield.

Figure 22:
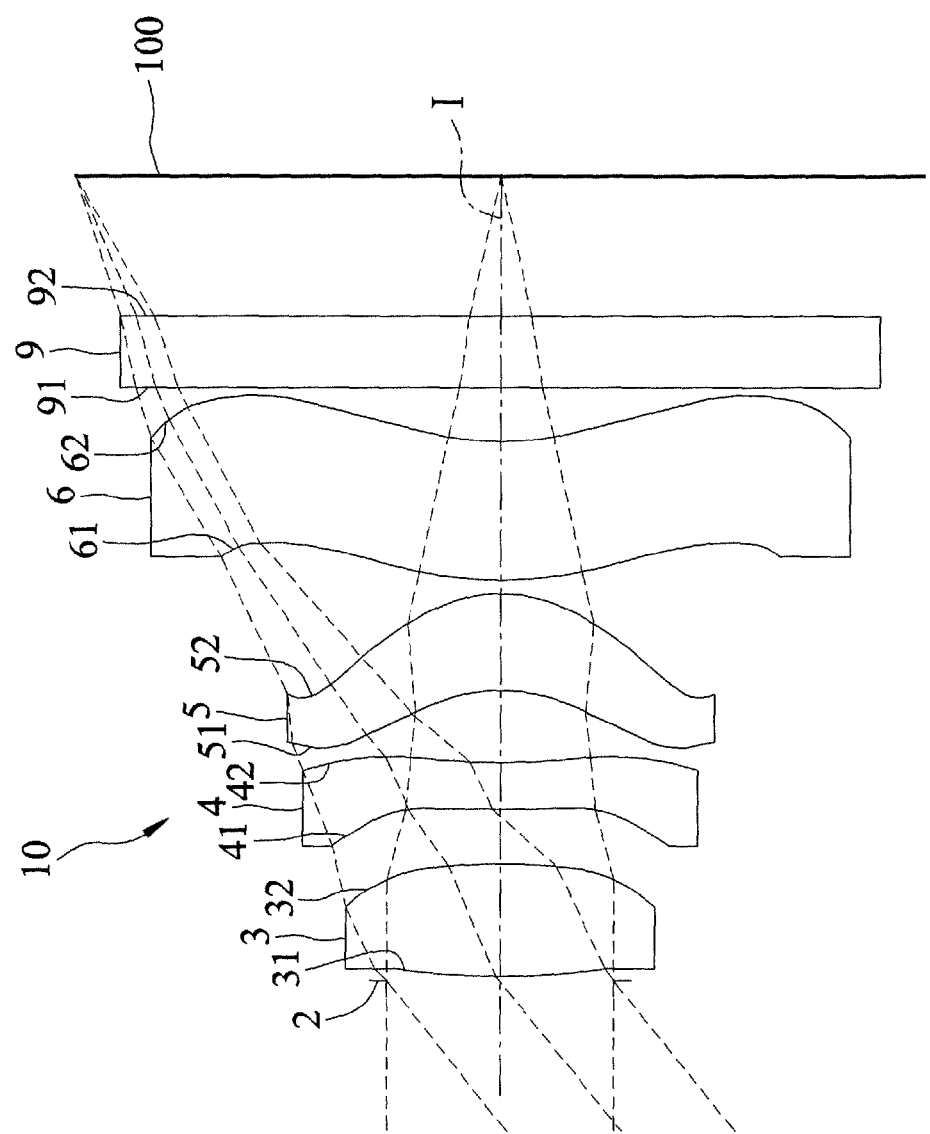
FIG. 22 is a schematic diagram that illustrates the fifth embodiment of an imaging lens according to the disclosure.
Figures 25A, 25B, 25C, 25D:
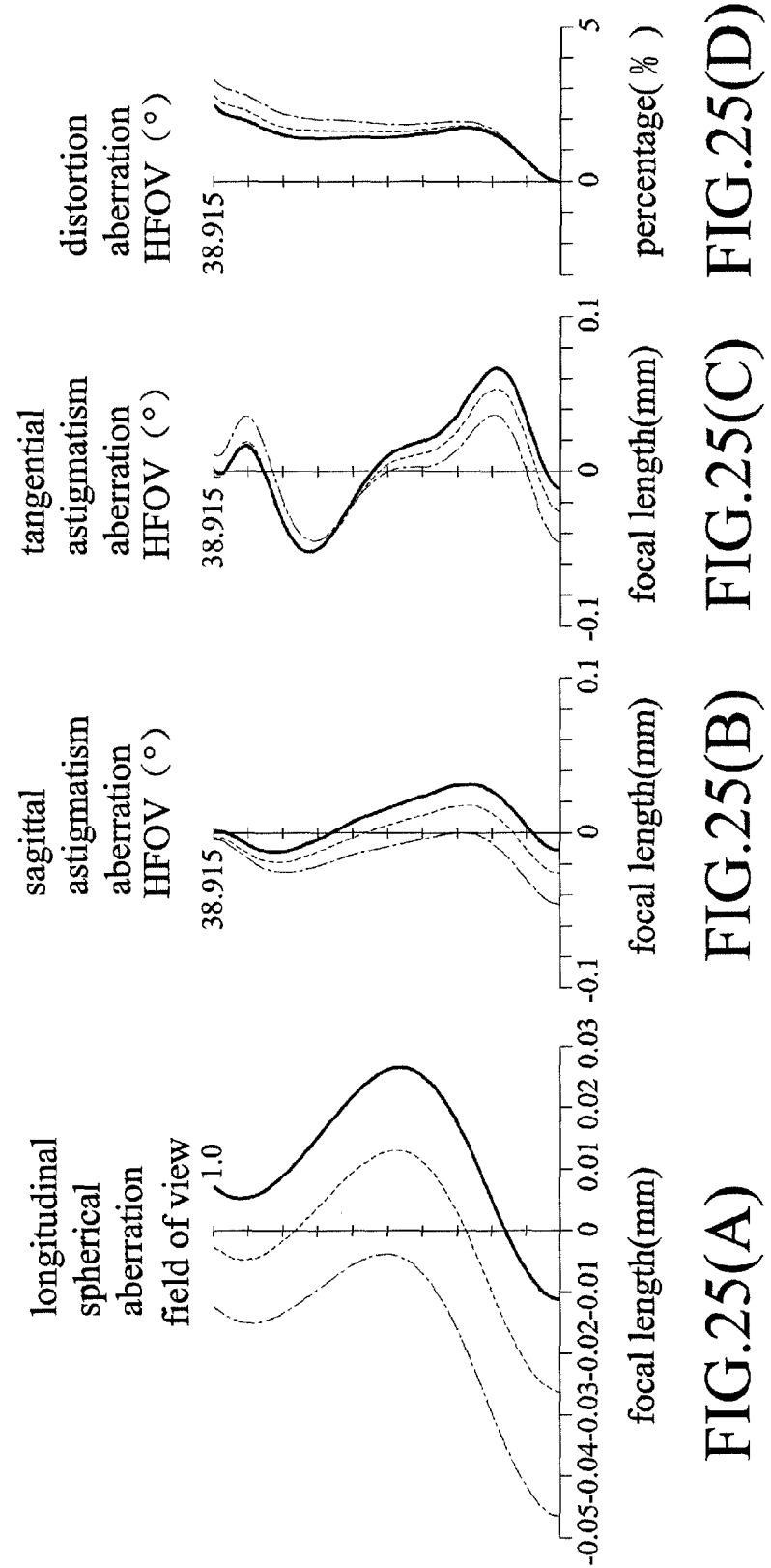
FIGS. 25(A) to 25(D) show different optical characteristics of the imaging lens of the fifth embodiment.

FIG. 22 illustrates a fifth embodiment of an imaging lens 10 according to the present disclosure, which has a configuration similar to that of the first embodiment and differs in optical data, aspherical coefficients, lens parameters of the first, second, third and fourth lens elements 3-6; and that the third lens element 5 has a positive refractive power and the fourth lens element 6 has a negative refractive power. It should be noted herein that, in order to clearly illustrate the fifth embodiment, reference numerals of the convex and concave portions that are the same as those of the first embodiment have been omitted in FIG. 22.

Shown in FIG. 23 is a table that lists values of some optical data corresponding to the surfaces 31, 41, 51, 61, 91, 32, 42, 52, 62, and 92 of the fifth embodiment. The imaging lens 10 has an overall system focal length of 2.108 mm, an HFOV of 38.915°, an F-number of 2.248, and a system length of 3.344 mm.

Shown in FIG. 24 is a table that lists values of some aspherical coefficients of the aforementioned relationship (1) corresponding to the fifth embodiment.

Relationships among some of the aforementioned lens parameters corresponding to the fifth embodiment are shown in FIG. 38.

FIGS. 25(A) to 25(D) respectively show simulation results corresponding to longitudinal spherical aberration, sagittal astigmatism aberration, tangential astigmatism aberration, and distortion aberration of the fifth embodiment. It can be understood from FIGS. 25(A) to 25(D) that the fifth embodiment is able to achieve a relatively good optical performance.

Via the aforementioned description, the advantage of the fifth embodiment in contrast to the first embodiment resides in that the F-number is smaller than that of the first embodiment, and the imaging lens 10 of this embodiment is easier to manufacture, providing higher yield.

Figure 26:
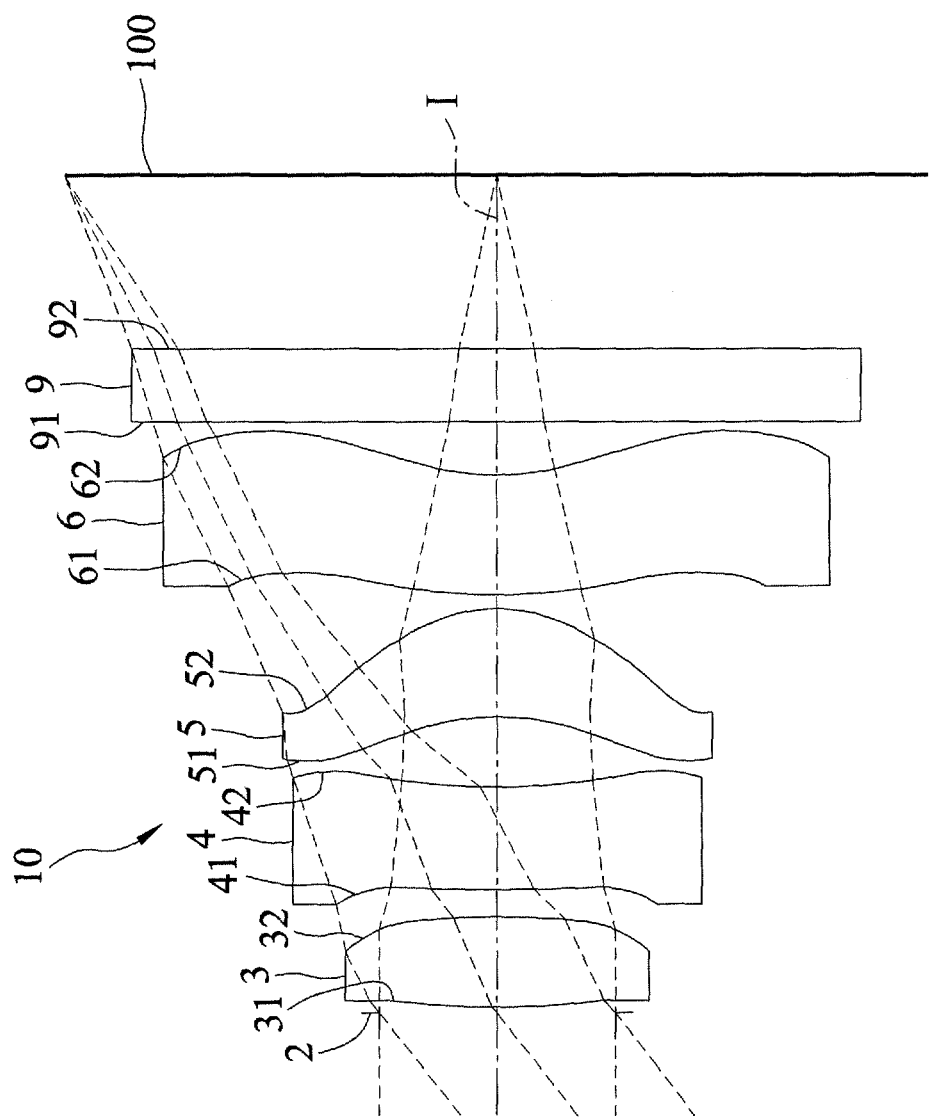
FIG. 26 is a schematic diagram that illustrates the sixth embodiment of an imaging lens according to the disclosure.
Figure 29:
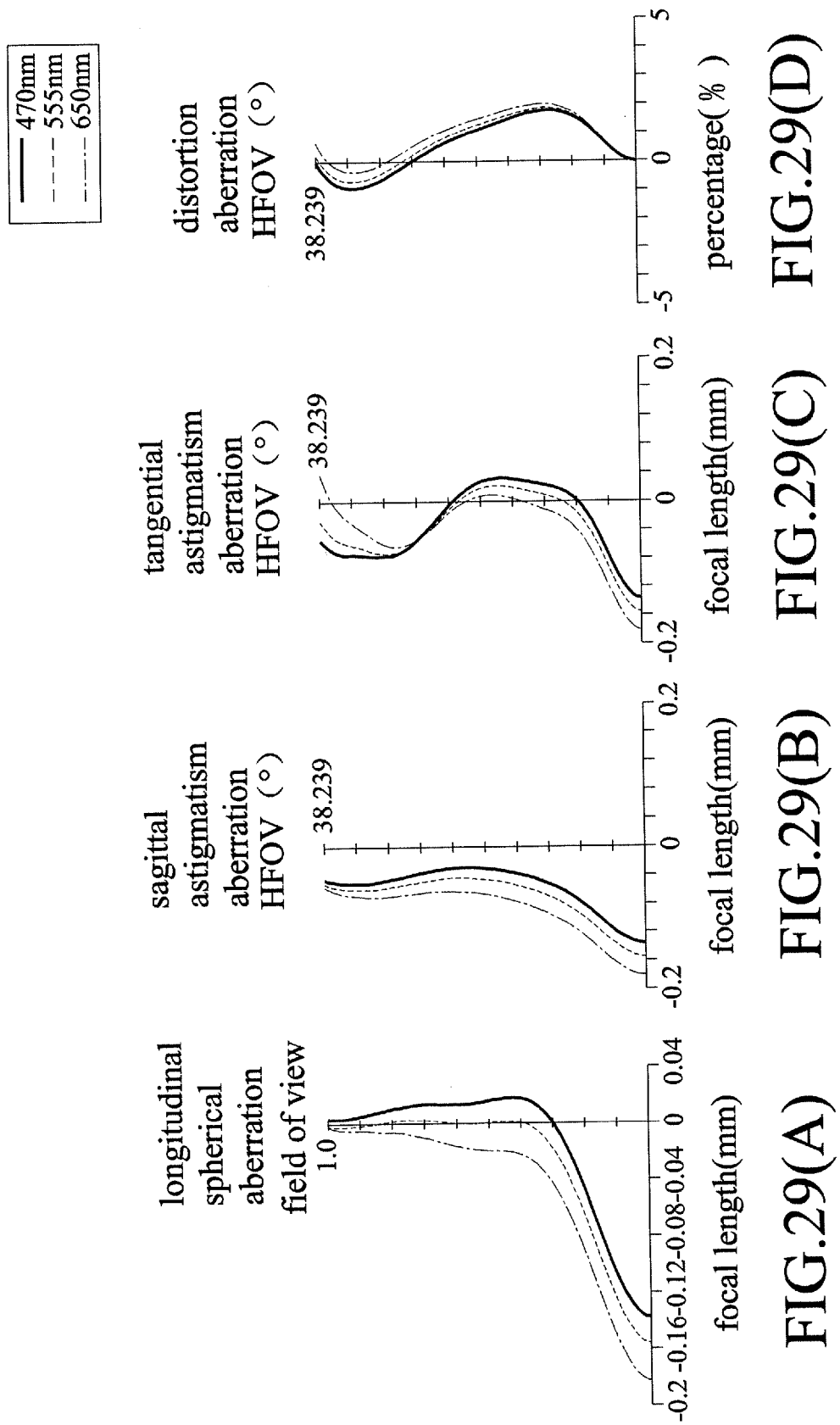
FIGS. 29(A) to 29(D) show different optical characteristics of the imaging lens of the sixth embodiment.

FIG. 26 illustrates a sixth embodiment of an imaging lens 10 according to the present disclosure, which has a configuration similar to that of the first embodiment and differs in optical data, aspherical coefficients, and lens parameters of the first, second, third and fourth lens elements 3-6; and that the second lens element 4 has a positive refractive power, the third lens element 5 has a positive refractive power and the fourth lens element 6 has a negative refractive power. It should be noted herein that, in order to clearly illustrate the sixth embodiment, reference numerals of the convex and concave portions that are the same as those of the first embodiment have been omitted in FIG. 26.

Shown in FIG. 27 is a table that lists values of some optical data corresponding to the surfaces 31, 41, 51, 61, 91, 32, 42, 52, 62, and 92 of the sixth embodiment. The imaging lens 10 has an overall system focal length of 2.112 mm, an HFOV of 38.239°, an F-number of 2.395, and a system length of 3.430 mm.

Shown in FIG. 28 is a table that lists values of some aspherical coefficients of the aforementioned relationship (1) corresponding to the sixth embodiment.

Relationships among some of the aforementioned lens parameters corresponding to the sixth embodiment are shown in FIG. 38.

FIGS. 29(A) to 29(D) respectively show simulation results corresponding to longitudinal spherical aberration, sagittal astigmatism aberration, tangential astigmatism aberration, and distortion aberration of the sixth embodiment. It can be understood from FIGS. 29(A) to 29(D) that the sixth embodiment is able to achieve a relatively good optical performance.

Via the aforementioned description, the advantage of the sixth embodiment in contrast to the first embodiment resides in that the imaging lens 10 of the sixth embodiment is easier to manufacture, providing higher yield.

Figure 30:
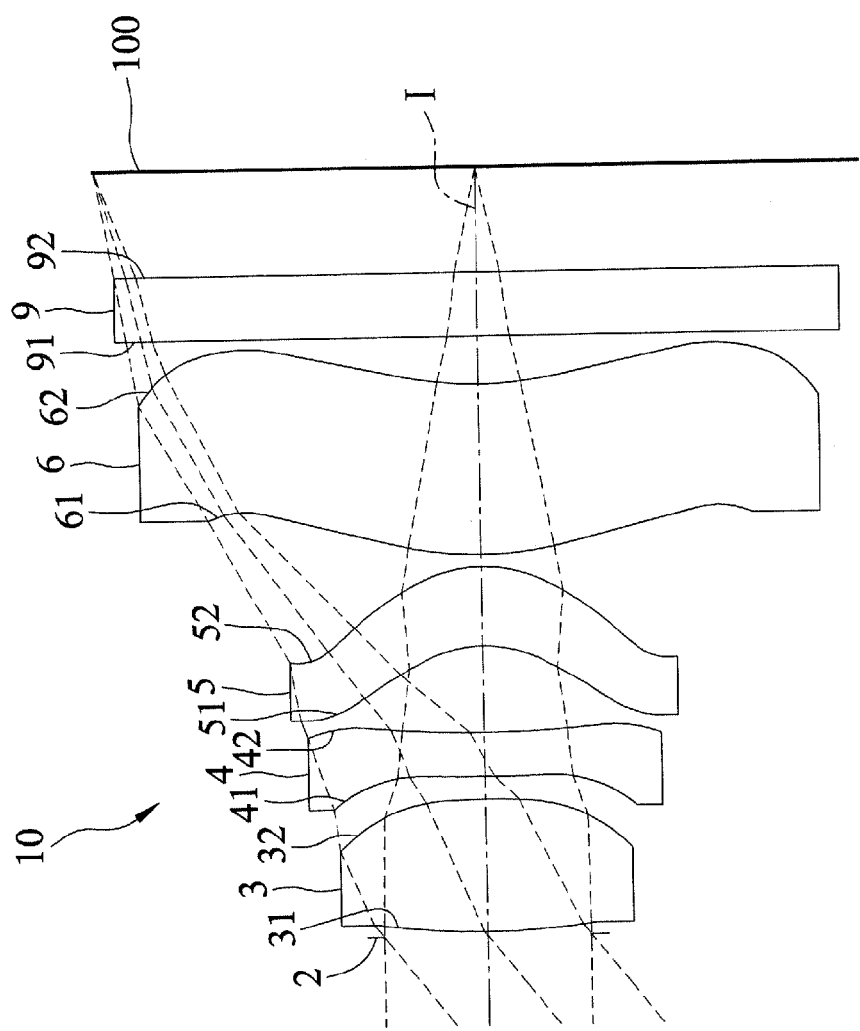
FIG. 30 is a schematic diagram that illustrates the seventh embodiment of an imaging lens according to the disclosure.
Figure 33:
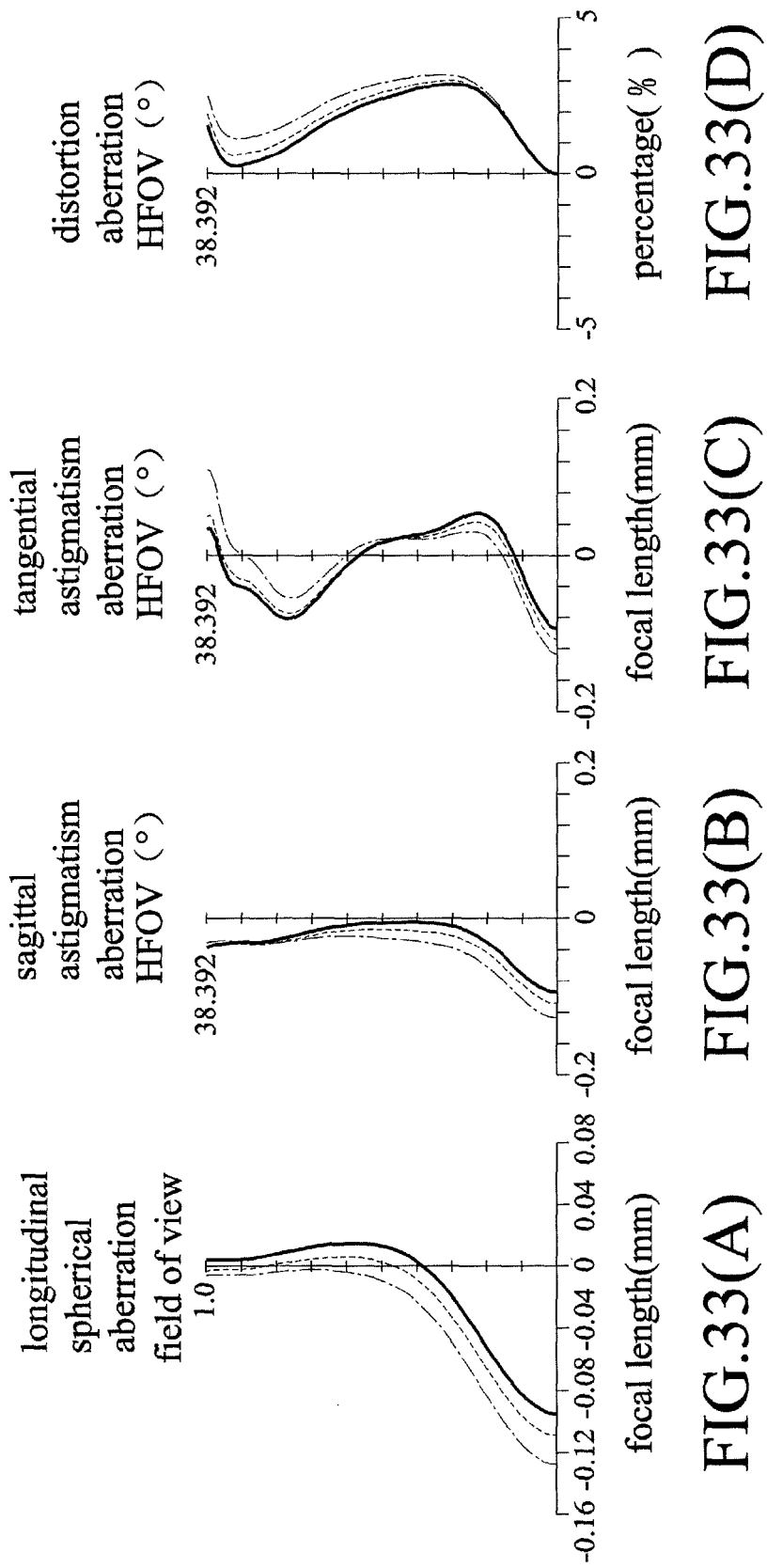
FIGS. 33(A) to 33(D) show different optical characteristics of the imaging lens of the seventh embodiment.

FIG. 30 illustrates a seventh embodiment of an imaging lens 10 according to the present disclosure, which has a configuration similar to that of the first embodiment and differs in optical data, aspherical coefficients, and lens parameters of the first, second, third and fourth lens elements 3-6; and that the third lens element 5 has a positive refractive power. It should be noted herein that, in order to clearly illustrate the seventh embodiment, reference numerals of the convex and concave portions that are the same as those of the first embodiment have been omitted in FIG. 30.

Shown in FIG. 31 is a table that lists values of some optical data corresponding to the surfaces 31, 41, 51, 61, 91, 32, 42, 52, 62, and 92 of the seventh embodiment. The imaging lens 10 has an overall system focal length of 2.109 mm, an HFOV of 38.392°, an F-number of 2.345, and a system length of 3.555 mm.

Shown in FIG. 32 is a table that lists values of some aspherical coefficients of the aforementioned relationship (1) corresponding to the seventh embodiment.

Relationships among some of the aforementioned lens parameters corresponding to the seventh embodiment are shown in FIG. 38.

FIGS. 33(A) to 33(D) respectively show simulation results corresponding to longitudinal spherical aberration, sagittal astigmatism aberration, tangential astigmatism aberration, and distortion aberration of the seventh embodiment. It can be understood from FIGS. 33(A) to 33(D) that the seventh embodiment is able to achieve a relatively good optical performance.

Via the aforementioned description, the advantage of the seventh embodiment in contrast to the first embodiment resides in that the imaging lens 10 of the seventh embodiment is easier to manufacture, providing higher yield.

Figure 34:
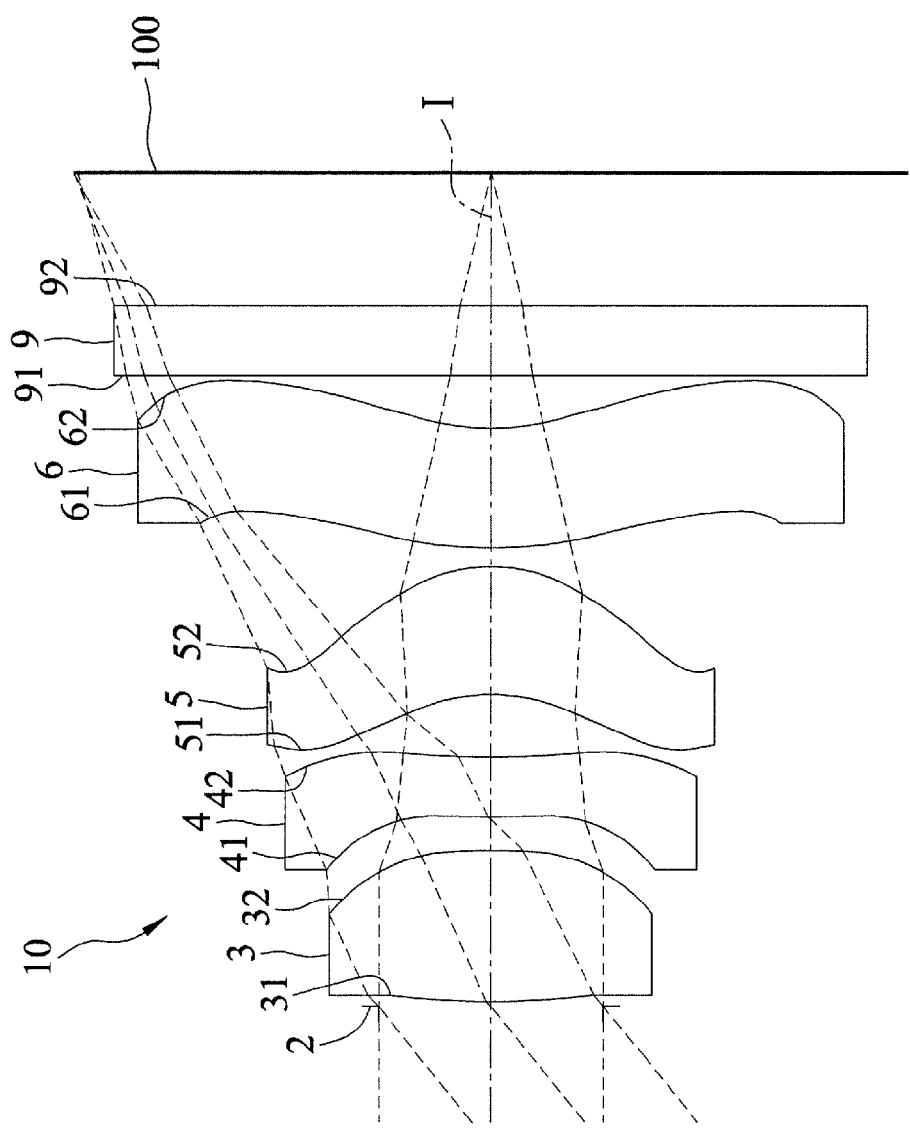
FIG. 34 is a schematic diagram that illustrates the eighth embodiment of an imaging lens according to the disclosure.
Figure 37:
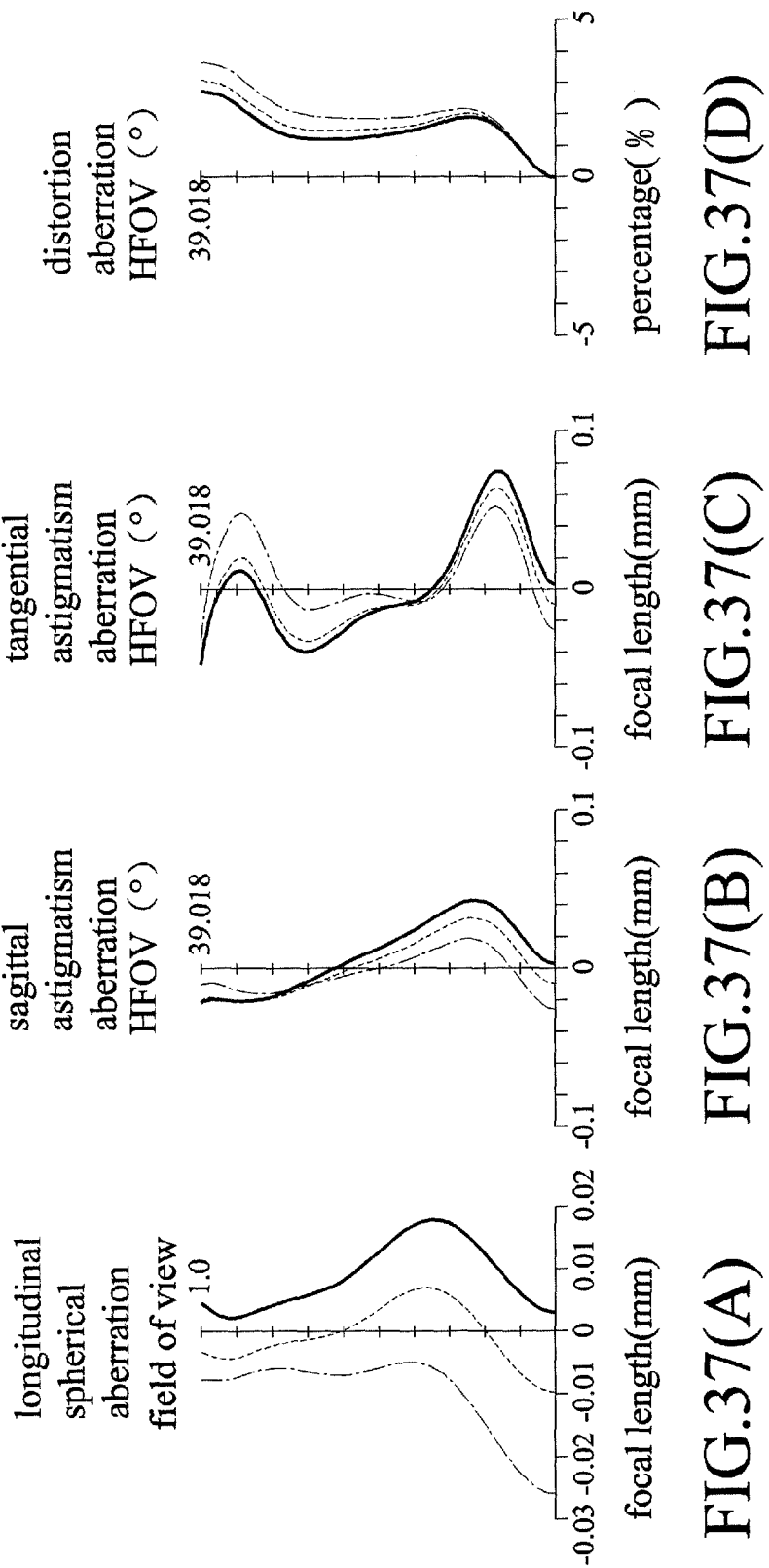
FIGS. 37(A) to 37(D) show different optical characteristics of the imaging lens of the eighth embodiment.

FIG. 34 illustrates an eighth embodiment of an imaging lens 10 according to the present disclosure, which has a configuration similar to that of the first embodiment and differs in optical data, aspherical coefficients, and lens parameters of the first, second, third and fourth lens elements 3-6; and that the third lens element 5 has a positive refractive power and the fourth lens element 6 has a negative refractive power. It should be noted herein that, in order to clearly illustrate the eighth embodiment, reference numerals of the convex and concave portions that are the same as those of the first embodiment have been omitted in FIG. 34.

Shown in FIG. 35 is a table that lists values of some optical data corresponding to the surfaces 31, 41, 51, 61, 91, 32, 42, 52, 62, and 92 of the eighth embodiment. The imaging lens 10 has an overall system focal length of 2.108 mm, an HFOV of 39.018°, an F-number of 2.239, and a system length of 3.526 mm.

Shown in FIG. 36 is a table that lists values of some aspherical coefficients of the aforementioned relationship (1) corresponding to the eighth embodiment.

Relationships among some of the aforementioned lens parameters corresponding to the seventh embodiment are shown in FIG. 38.

FIGS. 37(A) to 37(D) respectively show simulation results corresponding to longitudinal spherical aberration, sagittal astigmatism aberration, tangential astigmatism aberration, and distortion aberration of the eighth embodiment. It can be understood from FIGS. 37(A) to 37(D) that the eighth embodiment is able to achieve a relatively good optical performance.

Via the aforementioned description, the advantage of the eighth embodiment in contrast to the first embodiment resides in that the F-number is smaller than that of the first embodiment, and the imaging lens 10 of this embodiment is easier to manufacture, providing higher yield.

Shown in FIG. 38 is a table that lists the aforesaid relationships among some of the aforementioned lens parameters corresponding to the eight embodiments. When the lens parameters of the imaging lens 10 according to this disclosure satisfy the following relationships, the optical performance is still relatively good even with the reduced system length:

(1) The imaging lens 10 has a better configuration, which produces good image quality while maintaining a sufficient production yield, when one of the following conditions is satisfied: G23/G34≥3.00, G23/T1≥0.38, G23/T2≥0.60, G23/T4≤0.50, Gaa/T1≤0.60, Gaa/T2≤1.00 and Gaa/T3≤0.60. And a more appropriate/suitable size is maintained if one of the following conditions is further satisfied: 3.00≤G23/G34≤8.00, 0.38≤G23/T1≤1.30, 0.60≤G23/T2≤2.50, 0.50≤G23/T4≤1.00, 0.60≤Gaa/T1≤1.50, 1.00≤Gaa/T2≤3.00 and 0.60≤Gaa/T3≤3.00.

(2) When one of the following conditions is satisfied, size of the imaging lens 10 may be reduced by reducing the parameter of the numerator while having a fixed parameter for the denominator: ALT/G23≤9.00, ALT/Gaa≤4.50, BFL/G23≤5.50, BFL/Gaa≤3.10, Gaa/G23≤2.00, T1/G23≤3.00, T3/G23≤3.00, T3/T1≤1.20, T3/T2≤2.18, TTL/G23≤16.00 and TTL/Gaa≤9.00. Better image quality may be achieved if one of the following conditions is further satisfied: 3.00≤ALT/G23≤9.00, 2.00≤ALT/Gaa≤4.50, 2.00≤BFL/G23≤5.50, 1.50≤BFL/Gaa≤3.10, 1.00≤Gaa/G23≤2.00, 1.00≤T1/G23≤3.00, 0.45≤T3/G23≤3.00, 0.30≤T3/T1≤1.20, 1.00≤T3/T2≤2.18, 5.00≤TTL/G23≤16.00 and 5.00≤TTL/Gaa≤9.00.

However, in view of the unpredictability of the optical system design, under the framework of the present disclosure, conforming with the aforementioned conditions, the imaging lens 10 may have a shorter system length, a smaller F-number, a wider field-of-view, better imaging quality or enhanced assembly yield compared to the prior art.

To sum up, effects and advantages of the imaging lens 10 according to the present disclosure are described hereinafter.

1) The longitudinal spherical aberration, astigmatism aberration, distortion, etc., of each of the embodiments are in compliance with the specification of use. In addition, the off-axis rays of the representative wavelengths of the red, green and blue rays at different HFOVs are concentrated near the imaging point, where from the deviation of each curve, aberration of the imaging point of the off-axis rays at different HFOVs can be seen to obtain control and have good suppression on spherical aberration, astigmatism aberration and distortion. Further referring to the imaging quality data, the representative wavelengths of the red, green and blue rays are close to each other, showing that the present disclosure, under different conditions, may converge light rays of different wavelengths and has an excellent ability to inhibit chromatic dispersion. In other words, through the lens design and arrangement of the present disclosure, excellent imaging quality may be produced.

2) Through the aforesaid eight embodiments, it is known that the length of the imaging lens 10 of this disclosure may be reduced down to below 3.6 mm while maintaining good optical performance.

Figure 39:
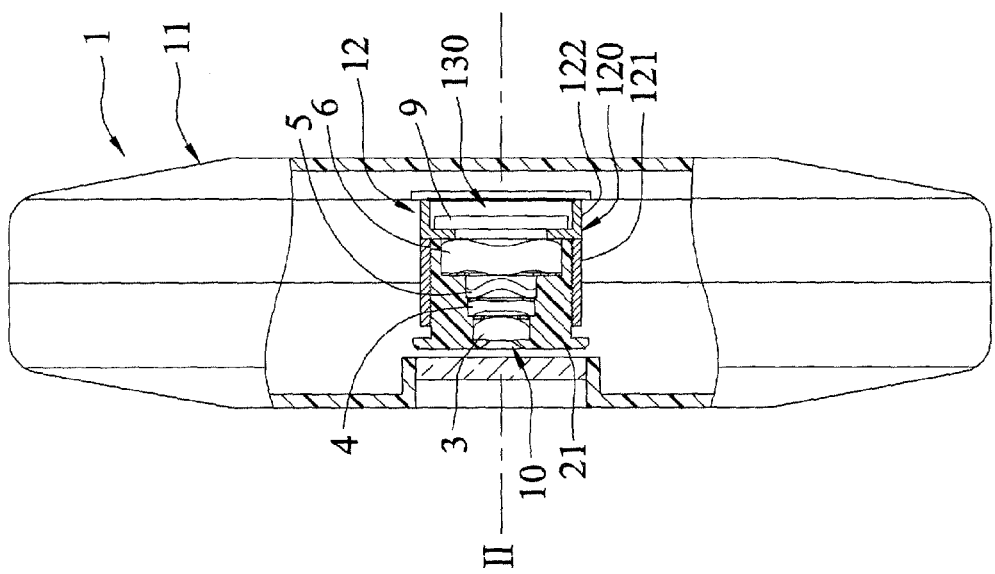
FIG. 39 is a schematic partly sectional view to illustrate a first exemplary application of the imaging lens of the disclosure.

Shown in FIG. 39 is a first exemplary application of the imaging lens 10, in which the imaging lens 10 is disposed in a housing 11 of an electronic apparatus 1 (such as a mobile phone, but not limited thereto), and forms apart of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 6).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 40:
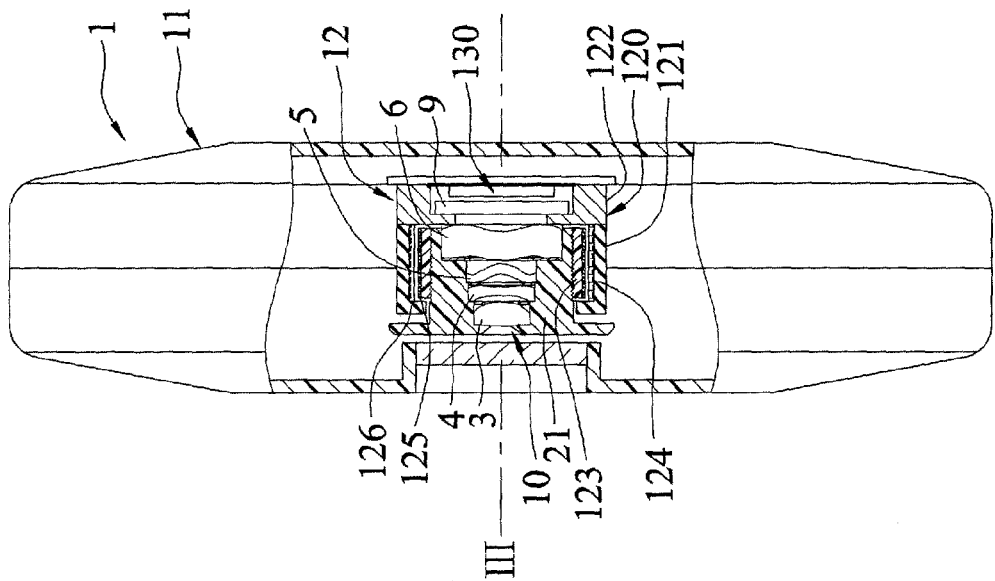
FIG. 40 is a schematic partly sectional view to illustrate a second exemplary application of the imaging lens of the disclosure.

Shown in FIG. 40 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present disclosure, the electronic apparatus 1 in each of the exemplary applications may be configured to have a relatively reduced overall thickness with good optical and imaging performance, so as to reduce cost of materials, and satisfy requirements of product miniaturization.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. An imaging lens comprising an aperture stop, a first lens element, a second lens element, a third lens element and a fourth lens element arranged in order from an object side to an image side along an optical axis of said imaging lens, each of said first lens element, said second lens element, said third lens element and said fourth lens element having an object-side surface facing toward the object side, and an image-side surface facing toward the image side, wherein:
    said image-side surface of said first lens element has a convex portion in a vicinity of the optical axis;
    said object-side surface of said second lens element has a convex portion in a vicinity of the optical axis, and said image-side surface of said second lens element has a convex portion in a vicinity of a periphery of said second lens element;
    said image-side surface of said third lens element has a concave portion in a vicinity of a periphery of said third lens element;
    said object-side surface of said fourth lens element has a concave portion in a vicinity of a periphery of said fourth lens element, and said image-side surface of said fourth lens element has a concave portion in a vicinity of the optical axis and a convex portion in a vicinity of the periphery of said fourth lens element;
    said imaging lens does not include any lens element with refractive power other than said first lens element, said second lens element, said third lens element and said fourth lens element; and
    said imaging lens satisfies $3.00 \leq G23/G34 \leq 8.00$ and $T3/T1 \leq 1.20$, where G23 represents an air gap length between said second lens element and said third lens element at the optical axis, G34 represents an air gap length between said third lens element and said fourth lens element at the optical axis, T1 represents a thickness of said first lens element at the optical axis, and T3 represents a thickness of said third lens element at the optical axis.

2. The imaging lens as claimed in claim 1, satisfying $0.50 \leq G23/T4 \leq 1.00$, where T4 represents a thickness of said fourth lens element at the optical axis.

3. The imaging lens as claimed in claim 1, satisfying $BFL/Gaa \leq 3.10$, where BFL represents a distance between said image-side surface of said fourth lens element and an image plane at the optical axis, and Gaa represents a sum of three air gap lengths among said first lens element, said second lens element, said third lens element and said fourth lens element at the optical axis.

4. The imaging lens as claimed in claim 3, further satisfying $T3/T2 \leq 2.18$, where T2 represents a thickness of said second lens element at the optical axis.

5. The imaging lens as claimed in claim 1, satisfying $TTL/Gaa \leq 9.00$, where TTL represents a distance between said object-side surface of said first lens element and an image plane at the optical axis, and Gaa represents a sum of three air gap lengths among said first lens element, said second lens element, said third lens element and said fourth lens element at the optical axis.

6. The imaging lens as claimed in claim 5, further satisfying $Gaa/G23 \leq 2.00$.

7. The imaging lens as claimed in claim 1, satisfying $0.60 \leq Gaa/T1 \leq 1.50$, where Gaa represents a sum of three air gap lengths among said first lens element, said second lens element, said third lens element and said fourth lens element at the optical axis.

8. The imaging lens as claimed in claim 1, satisfying $1.00 \leq Gaa/T2 \leq 3.00$, where Gaa represents a sum of three air gap lengths among said first lens element, said second lens element, said third lens element and said fourth lens element at the optical axis, and T2 represents a thickness of said second lens element at the optical axis.

9. The imaging lens as claimed in claim 1, satisfying $BFL/G23 \leq 5.50$, where BFL represents a distance between said image-side surface of said fourth lens element and an image plane at the optical axis.

10. The imaging lens as claimed in claim 9, further satisfying $0.38 \leq G23/T1 \leq 1.30$.

11. The imaging lens as claimed in claim 1, satisfying ALT/Gaa≤4.50, where ALT represents a sum of thicknesses of said first lens element, said second lens element, said third lens element and said fourth lens element at the optical axis, and Gaa represents a sum of three air gap lengths among said first lens element, said second lens element, said third lens element and said fourth lens element at the optical axis.

12. The imaging lens as claimed in claim 11, further satisfying T3/G23≤3.00.

13. The imaging lens as claimed in claim 1, satisfying TTL/G23≤16.00, where TTL represents a distance between said object-side surface of said first lens element and an image plane at the optical axis.

14. The imaging lens as claimed in claim 1, satisfying $0.60 \leq G23/T2 \leq 2.50$, where T2 represents a thickness of said second lens element at the optical axis.

15. The imaging lens as claimed in claim 1, satisfying ALT/G23≤9.00, where ALT represents a sum of thicknesses of said first lens element, said second lens element, said third lens element and said fourth lens element at the optical axis.

16. The imaging lens as claimed in claim 1, satisfying T1/G23≤3.00.

17. The imaging lens as claimed in claim 1, satisfying $0.60 \leq Gaa/T3 \leq 3.00$, where Gaa represents a sum of three air gap lengths among said first lens element, said second lens element, said third lens element and said fourth lens element at the optical axis.

18. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *